United States Patent
Hirasawa et al.

(10) Patent No.: US 11,212,487 B2
(45) Date of Patent: Dec. 28, 2021

(54) STAYING STATE DISPLAY SYSTEM AND STAYING STATE DISPLAY METHOD

(71) Applicant: PANASONIC INTELLECTUAL PROPERTY MANAGEMENT CO., LTD., Osaka (JP)

(72) Inventors: Sonoko Hirasawa, Kanagawa (JP); Takeshi Fujimatsu, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 189 days.

(21) Appl. No.: 16/606,463

(22) PCT Filed: Mar. 30, 2018

(86) PCT No.: PCT/JP2018/013652
§ 371 (c)(1),
(2) Date: Oct. 18, 2019

(87) PCT Pub. No.: WO2018/193813
PCT Pub. Date: Oct. 25, 2018

(65) Prior Publication Data
US 2021/0281803 A1    Sep. 9, 2021

(30) Foreign Application Priority Data

Apr. 21, 2017  (JP) .............................. JP2017-084130
Apr. 21, 2017  (JP) .............................. JP2017-084132
(Continued)

(51) Int. Cl.
*H04N 7/15*     (2006.01)
*G06K 9/00*     (2006.01)
*G06Q 10/02*    (2012.01)

(52) U.S. Cl.
CPC ........... *H04N 7/15* (2013.01); *G06K 9/00228* (2013.01); *G06K 9/00771* (2013.01); *G06Q 10/02* (2013.01)

(58) Field of Classification Search
CPC . H04N 7/15; G06Q 10/02; G06K 9/00; G08B 21/22; G08B 5/221
(Continued)

(56) References Cited

U.S. PATENT DOCUMENTS

2004/0095467 A1   5/2004  Koizumi
2007/0016649 A1*  1/2007  Nishiki ................... H04L 67/24
                                                709/206
(Continued)

FOREIGN PATENT DOCUMENTS

JP    09-091354       4/1997
JP    09091354 A  *   4/1997
(Continued)

OTHER PUBLICATIONS

NTT's new business platform "BOX Series", Business communication, vol. 36, No. 3, Mar. 1999, pp. 107-121.*
(Continued)

*Primary Examiner* — Melur Ramakrishnaiah
(74) *Attorney, Agent, or Firm* — Greenblum & Bernstein, P.L.C.

(57) ABSTRACT

Information having an appropriate content corresponding to an area in which a person stays can be presented to a user as information related to a staying state of the person in each area inside a facility. In a target area such as an office and a conference room, a processor of a facility management apparatus executes each process of seat occupancy detection, area determination, and screen control, obtains staying information related to the staying state of the person, and generates display information on which the staying infor-
(Continued)

mation is reflected in accordance with a display item for each target area based on a video of a camera.

20 Claims, 24 Drawing Sheets

(30) Foreign Application Priority Data

Apr. 21, 2017 (JP) .............................. JP2017-084134
Apr. 21, 2017 (JP) .............................. JP2017-084135
Apr. 21, 2017 (JP) .............................. JP2017-084136

(58) Field of Classification Search
USPC .......................................... 348/14.01–14.16
See application file for complete search history.

(56) References Cited

U.S. PATENT DOCUMENTS

| 2011/0157366 | A1* | 6/2011 | Padmanabh | G08B 13/196 |
| | | | | 348/159 |
| 2012/0327099 | A1* | 12/2012 | Vojak | G06F 3/0304 |
| | | | | 345/581 |
| 2013/0003935 | A1* | 1/2013 | Barty | H05G 2/008 |
| | | | | 378/121 |
| 2013/0003953 | A1 | 1/2013 | Okubo | |
| 2017/0358182 | A1* | 12/2017 | El-Iraki | G08B 29/185 |

FOREIGN PATENT DOCUMENTS

| JP | 11-134349 | | 5/1999 | |
| JP | 11134349 | A * | 5/1999 | |
| JP | 2002-260110 | | 9/2002 | |
| JP | 2007-026016 | | 2/2007 | |
| JP | 2007-219939 | | 8/2007 | |
| JP | 2012-038242 | | 2/2012 | |
| JP | 2012038242 | A * | 2/2012 | |
| JP | 2013-218511 | | 10/2013 | |
| JP | 2013218511 | A * | 10/2013 | |
| JP | 2013-236520 | | 11/2013 | |
| JP | 2016-095560 | | 5/2016 | |
| WO | 2009/107618 | | 9/2009 | |
| WO | WO-2009107618 | A1 * | 9/2009 | ............. H04L 41/00 |
| WO | 2011/125288 | | 10/2011 | |

OTHER PUBLICATIONS

International Search Report (ISR) from International Searching Authority (Japan Patent Office) in International Pat. Appl. No. PCT/JP2018/013652, dated Jun. 26, 2018.

NTT's new business platform "BOX series", Business Communication, Business Communication, vol. 36, No. 3, Mar. 1999, pp. 107-121 (partial English translation, pp. 110-111, line 6).

* cited by examiner

OFFICE
1

CONFERENCE
ROOM
1

SECTION

COMMON
ROOM
1

SECTION

DETECTION AREA

OFFICE

CONFERENCE ROOM

DETECTION AREA

SECTION

COMMON ROOM

DETECTION AREA

SECTION

| CAMERA ID | CAMERA NAME | ROOM NUMBER | ROOM ATTRIBUTE |
|---|---|---|---|
| 001 | CAMERA 1 | 101 | CONFERENCE ROOM |
| 002 | CAMERA 2 | 102 | CONFERENCE ROOM |
| ... | ... | ... | ... |
| 013 | CAMERA 21 | 201 | COMMON ROOM |
| 014 | CAMERA 22 | 202 | COMMON ROOM |
| ... | ... | ... | ... |
| 023 | CAMERA 31 | 301 | OFFICE |
| 024 | CAMERA 32 | 302 | OFFICE |
| ... | ... | ... | ... |

STAYING STATE DISPLAY SYSTEM AND STAYING STATE DISPLAY METHOD

TECHNICAL FIELD

The present disclosure relates to a staying state display system and a staying state display method for generating display information related to a staying state of a person in a target area based on a video captured by a camera installed in a facility.

BACKGROUND ART

In a facility such as an office building, a monitoring system that monitors a state inside the facility using a video of a camera by installing the camera capturing the inside of the facility has been widely used. In a case where information related to a staying state of a person inside the facility is obtained using the video of the camera and the information is presented to a user, it is possible to simply check whether or not a person to meet for a predetermined purpose is in the person's own seat, and the convenience of the user is improved.

As such a technology for presenting the staying state of the person to the user, a technology for obtaining information related to a seat occupancy state of the person, specifically, information related to seat occupancy and seat vacancy, presence in a conference, presence in a call, refusal to meet, and the like, based on a video of a camera, presenting the information to the user, and also presenting statistical information related to an occupancy rate such as a seat occupancy rate and a seat vacancy rate, a congestion degree, a congested location, and the like to the user is known in the related art (refer to PTL 1).

CITATION LIST

Patent Literature

PTL 1: Japanese Patent Unexamined Publication No. 2002-260110

SUMMARY OF THE INVENTION

The staying state (seat occupancy state) related to whether or not the person is setting in the person's own seat may be presented to the user who wants to know whether or not the person is sitting in the person's own seat in the office (workroom). However, as information desired by the user, the user may further want to know whether or not the person is present in a conference room, that is, whether or not the conference room is in use. The content of the information desired by the user varies depending on the location in which the person stays.

However, in the technology of the related art, only the information related to whether or not a person is present at a specific location is presented to the user. A problem arises in that information having a content desired by the user cannot be presented to the user depending on the location in which the person stays.

In addition, it may be required to check seat occupancy states of a plurality of persons at once. For example, the user who wants to check the seat occupancy state of a specific person may want to check the seat occupancy state of the person and also the seat occupancy state of another person having a seat nearby, for example, another person belonging to the same team as the specific person.

However, in the technology of the related art, only staying information related to whether or not a person is present at a specific location is presented to the user. A problem arises in that the staying states of a plurality of persons cannot be checked at once. In addition, in the case of presenting the staying states of the plurality of persons to the user, it is desired that each of the persons can be simply identified.

In addition, in a case where a usage state of the conference room is presented to the user, the user can select and use the conference room that is not in use. Generally, the conference room can be used through reservation. Thus, even in a case where the conference room is not currently in use, the conference room cannot be used in a case where the conference room is reserved. Therefore, a technology for enabling the user to simply check whether or not the conference room currently not in use is reserved is desired.

In the technology of the related art, the user can check the usage state of the conference room, but a requirement such that the user wants to check the current reservation state of the conference room not in use is not considered. A problem arises in that the conference room that is left unused cannot be effectively used.

In addition, in a store such as a restaurant, a free layout may be available. That is, customers and staff can freely move chairs and tables during an operation time period. In this case, a detection area that is set in advance on a video for detecting the seat occupancy of the person deviates from the actual position of the seat. Thus, the accuracy of seat occupancy detection is decreased. Therefore, a technology for accurately detecting the seat occupancy state of the person even in a case where the position of the seat is changed is desired.

However, in the technology of the related art, only the staying information related to whether or not a person is present at a specific location is presented to the user, and dealing with a case where the position of the seat is changed is not considered. A problem arises in that the seat occupancy state of the person cannot be accurately detected in a case where the position of the seat is changed.

In addition, in a location such as the office where multiple persons stay, it may be desired that the user can simply check the staying state of each person by presenting the staying information having excellent visibility to the user. Therefore, it is considered that a staying map (seat occupancy map) in which an image representing the staying state of each person is superimposed on the seat (original position) of each person on an area map representing a layout of the target area is displayed.

In the office, the positions of desks and chairs and seat assignment may be frequently changed along with a change in organization and the like. Thus, it is necessary to frequently create and update the staying map, and a large amount of effort is required. Therefore, a technology for efficiently creating and updating the staying map is desired.

However, in the technology of the related art, only the staying information related to whether or not a person is present at a specific location is presented to the user, and presentation of the staying map having excellent visibility to the user is not considered. A problem arises in that a work of creating and updating the staying map cannot be efficiently performed.

A first object of the present disclosure is to provide a staying state display system and a staying state display method capable of presenting information having an appropriate content corresponding to an area in which a person stays to a user as information related to a staying state of the person in each area inside a facility.

In addition, a second object of the present disclosure is to provide a staying state display system and a staying state display method capable of checking seat occupancy states of a plurality of persons at once and presenting information that has excellent visibility and enables each person to be simply identified to a user.

In addition, a third object of the present disclosure is to provide a staying state display system and a staying state display method capable of effectively using an area that is reserved but is left unused by enabling a user to simply check a usage state of a target area such as a conference room and also a reservation state of the target area.

In addition, a fourth object of the present disclosure is to provide a staying state display system and a staying state display method capable of accurately detecting a staying state of a person even in a location in which a position of an object such as a chair defining a staying position of the person can be changed.

In addition, a fifth object of the present disclosure is to provide a staying state display system and a staying state display method capable of efficiently performing a work of creating and updating a staying map having excellent visibility in the case of presenting a staying state of each person with respect to a location in which multiple persons stay as a target.

A staying state display system of the present disclosure is configured as a staying state display system that causes a processor to execute a process of obtaining a video captured by a camera installed in a facility and generating display information related to a staying state of a person in a target area. The processor detects staying of the person in a detection area in which staying of the person is expected and obtains staying information related to the staying state of the person in each detection area based on the video, and generates the display information on which the staying information is reflected in accordance with a display item corresponding to an area attribute that is set in advance for each target area.

In addition, a staying state display system of the present disclosure is configured as a staying state display system that causes a processor to execute a process of obtaining a video captured by a camera installed in a facility in real time and generating display information related to a current staying state of a person in a target area. The processor detects staying of the person in a detection area in which staying of the person is expected in the target area and obtains staying information related to the staying state of the person in each detection area based on the video, generates a person image of which a display form varies depending on the staying state of the person based on the staying information, and generates the display information in which the person image is superimposed on an area image representing the target area.

In addition, a staying state display system of the present disclosure is configured as a staying state display system that causes a processor to execute a process of obtaining a video captured by a camera installed in a facility in real time and generating display information related to a current staying state of a person in a target area usable through reservation. The processor detects staying of the person in the target area and obtains staying information related to the staying state of the person in the target area based on the video, determines a usage state of the target area based on the staying information, obtains reservation information related to the target area, and generates the display information including a template image representing the current usage state of the target area and information related to a current reservation state of the target area.

In addition, a staying state display system of the present disclosure is configured as a staying state display system that causes a processor to execute a process of obtaining a video captured by a camera installed in a facility and generating display information related to a staying state of a person in a target area. The processor performs object detection of detecting a template object arranged in the target area from the video, performs area setting of setting a detection area in which staying of the person is expected on the video based on a detection result of the template object, detects staying of the person in the detection area and obtains staying information related to the staying state of the person in the detection area based on the video, and generates the display information based on the staying information.

In addition, a staying state display system of the present disclosure is configured as a staying state display system that causes a processor to execute a process of obtaining a video captured by a camera installed in a facility, displaying a staying map representing a staying state of a person in a target area, and generating the staying map depending on an editing operation performed by an operator. The processor displays an area image representing the target area and displays a person image displayed in the staying map in a list such that a display form is changed depending on the staying state of the person, and depending on the editing operation of selecting the person image and moving the person image onto the area image by the operator, generates the staying map in which the person image is arranged at an original position of each person in the area image.

In addition, a staying state display method of the present disclosure is configured as a staying state display method of causing a processor to execute a process of obtaining a video captured by a camera installed in a facility and generating display information related to a staying state of a person in a target area. The method includes detecting staying of the person in a detection area in which staying of the person is expected and obtaining staying information related to the staying state of the person in each detection area based on the video, and generating the display information on which the staying information is reflected in accordance with a display item corresponding to an area attribute that is set in advance for each target area.

In addition, a staying state display method of the present disclosure is configured as a staying state display method of causing a processor to execute a process of obtaining a video captured by a camera installed in a facility in real time and generating display information related to a current staying state of a person in a target area in the facility. The method includes, by the processor, detecting staying of the person in a detection area in which staying of the person is expected in the target area and obtaining staying information related to the staying state of the person in each detection area based on the video, generating a person image of which a display form varies depending on the staying state of the person based on the staying information, and generating the display information in which the person image is superimposed on an area image representing the target area.

In addition, a staying state display method of the present disclosure is configured as a staying state display method of causing a processor to execute a process of obtaining a video captured by a camera installed in a facility in real time and generating display information related to a current staying state of a person in a target area usable through reservation. The method includes, by the processor, detecting staying of the person in the target area and obtaining staying information related to the staying state of the person in the target area based on the video, determining a usage state of the target area based on the staying information, obtaining reservation information related to the target area, and generating the display information including a template image representing the current usage state of the target area and information related to a current reservation state of the target area.

In addition, a staying state display method of the present disclosure is configured as a staying state display method of causing a processor to execute a process of obtaining a video captured by a camera installed in a facility and generating display information related to a staying state of a person in a target area. The method includes, by the processor, performing object detection of detecting a template object arranged in the target area from the video, performing area setting of setting a detection area in which staying of the person is expected on the video based on a detection result of the template object, detecting staying of the person in the detection area and obtaining staying information related to the staying state of the person in the detection area based on the video, and generating the display information based on the staying information.

In addition, a staying state display method of the present disclosure is configured as a staying state display method of causing a processor to execute a process of obtaining a video captured by a camera installed in a facility, displaying a staying map representing a staying state of a person in a target area, and generating the staying map depending on an editing operation performed by an operator. The method includes displaying an area image representing the target area and displaying a person image displayed in the staying map in a list such that a display form is changed depending on the staying state of the person, and depending on the editing operation of selecting the person image and moving the person image onto the area image by the operator, generating the staying map in which the person image is arranged at an original position of each person in the area image.

According to the present disclosure, the display information on which the staying information is reflected in accordance with the display item corresponding to the area attribute set in advance for each target area is generated. Thus, information having an appropriate content corresponding to a location in which a person stays can be presented to a user.

In addition, according to the present disclosure, the user can perceive the staying state of each person using the person image superimposed on the area image. Accordingly, the seat occupancy states of a plurality of persons can be checked at once. Furthermore, the display information that has excellent visibility and enables each person to be simply identified can be presented to the user.

In addition, according to the present disclosure, the user can simply check the usage state of the target area and also the reservation state of the target area. An area that is reserved but is left unused can be effectively used.

In addition, according to the present disclosure, the template object (for example, a chair) defining the staying position of the person is detected from the video, and the detection area is set based on the detection result. Thus, even in a case where the position of the template object is changed, the staying state of the person can be accurately detected.

In addition, according to the present disclosure, the staying map is generated by the editing operation of selecting the person image and moving the person image onto the area image by the operator. Thus, a work of creating and updating the staying map can be efficiently performed.

DESCRIPTION OF EMBODIMENTS

Figure 1:
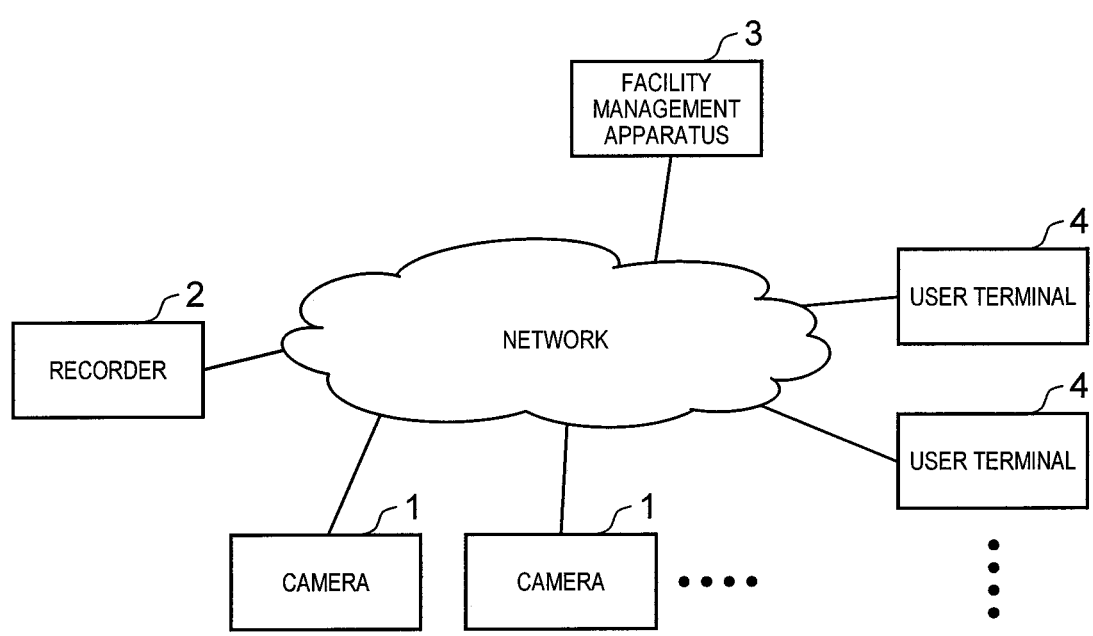
FIG. 1 is an overall configuration diagram of a staying state display system according to a first exemplary embodiment.

A first invention conceived for resolving the above problem is configured as a staying state display system that causes a processor to execute a process of obtaining a video captured by a camera installed in a facility and generating display information related to a staying state of a person in a target area. The processor detects staying of the person in a detection area in which staying of the person is expected and obtains staying information related to the staying state of the person for each detection area based on the video, and generates the display information on which the staying information is reflected in accordance with a display item corresponding to an area attribute that is set in advance for each target area.

Accordingly, the display information on which the staying information is reflected in accordance with the display item corresponding to the area attribute set in advance for each target area is generated. Thus, information having an appropriate content corresponding to a location in which the person stays can be presented to a user.

In addition, a second invention is configured such that the processor generates the display information in accordance with the display item for which the area attribute of a room as each of the target area corresponds to any of a workroom, a conference room, and a common room.

Accordingly, information having a content appropriate for each of the workroom, the conference room, and the common room can be presented to the user.

In addition, a third invention is configured such that the processor generates the display information using a usage state of an aggregate area in which a plurality of the detection areas are aggregated as the display item.

Accordingly, information having an appropriate content corresponding to the location in which the person stays can be presented to the user.

In addition, a fourth invention is configured such that the area attribute includes a first area attribute for which a seat occupancy state of the person in each detection area is used as the display item, a second area attribute for which a usage state of the whole target area is used as the display item, and a third area attribute for which a usage state of each of a plurality of sections set inside the target area is used as the display item.

Accordingly, information having an appropriate content corresponding to the location in which the person stays can be presented to the user.

In addition, a fifth invention is configured such that the processor generates the display information in which a template image illustrating the staying state is superimposed on an area map representing a layout of the target area.

Accordingly, information having an appropriate content corresponding to the location in which the person stays can be presented to the user in an easily understood manner.

In addition, a sixth invention is configured as a staying state display method of causing a processor to execute a process of obtaining a video captured by a camera installed in a facility and generating display information related to a staying state of a person in a target area. The method includes detecting staying of the person in a detection area in which staying of the person is expected and obtaining staying information related to the staying state of the person in each detection area based on the video, and generating the display information on which the staying information is reflected in accordance with a display item corresponding to an area attribute that is set in advance for each target area.

Accordingly, information having an appropriate content corresponding to the location in which the person stays can be presented to the user in the same manner as the first invention.

A seventh invention for resolving the above problem is configured as a staying state display system that causes a processor to execute a process of obtaining a video captured by a camera installed in a facility in real time and generating display information related to a current staying state of a person in a target area. The processor detects staying of the person in a detection area in which staying of the person is expected in the target area and obtains staying information related to the staying state of the person in each detection area based on the video, generates a person image of which a display form varies depending on the staying state of the person based on the staying information, and generates the display information in which the person image is superimposed on an area image representing the target area.

Accordingly, the user can perceive the staying state of each person using the person image superimposed on the area image. Accordingly, the seat occupancy states of a plurality of persons can be checked at once. Furthermore, the display information that has excellent visibility and enables each person to be simply identified can be presented to the user.

In addition, an eighth invention is configured such that the processor generates display information in which a plurality of the target areas are displayed in a list, and depending on an operation of selecting the target area by a user, generates the display information related to the selected target area.

Accordingly, in a case where the number of persons as a target is large in a large facility, the user can easily perceive the staying states of the persons by setting a plurality of target areas and displaying information for each target area.

In addition, a ninth invention is configured such that the person image includes a face image that is registered in advance.

Accordingly, the user can easily identify the person.

In addition, a tenth invention is configured such that the processor changes a display color of the person image depending on whether or not the person currently stays.

Accordingly, the user can easily perceive the current staying state of the person.

In addition, an eleventh invention is configured such that the processor changes a display color of the person image depending on a length of an absence time period of the person.

Accordingly, the user can easily perceive the absence time period of the person.

In addition, a twelfth invention is configured such that the processor, depending on an operation of selecting the person image by a user, displays past and future staying states of the person related to the selection.

Accordingly, the user can check the past and future seat occupancy states of the currently absent person.

In addition, a thirteenth invention is configured such that the processor, depending on an operation of selecting the person image by a user, displays a schedule of the person related to the selection.

Accordingly, the user can easily check the schedule of the currently absent person.

In addition, a fourteenth invention is configured such that the processor, depending on an operation of selecting the person image by a user, displays a screen for creating an electronic mail having the person related to the selection as a recipient.

Accordingly, the user can easily create an electronic mail having the currently absent person as a recipient.

In addition, a fifteenth invention is configured as a staying state display method of causing a processor to execute a process of obtaining a video captured by a camera installed in a facility in real time and generating display information related to a current staying state of a person in a target area in the facility. The method includes, by the processor, detecting staying of the person in a detection area in which staying of the person is expected in the target area and obtaining staying information related to the staying state of the person in each detection area based on the video, generating a person image of which a display form varies depending on the staying state of the person based on the staying information, and generating the display information in which the person image is superimposed on an area image representing the target area.

Accordingly, in the same manner as the seventh invention, the seat occupancy states of a plurality of persons can be checked at once. Furthermore, information that has excellent visibility and enables each person to be simply identified can be presented to the user.

A sixteenth invention for resolving the above problem is configured as a staying state display system that causes a processor to execute a process of obtaining a video captured by a camera installed in a facility in real time and generating display information related to a current staying state of a person in a target area usable through reservation. The processor detects staying of the person in the target area and obtains staying information related to the staying state of the person in the target area based on the video, determines a usage state of the target area based on the staying information, obtains reservation information related to the target area, and generates the display information including a template image representing the current usage state of the target area and information related to a current reservation state of the target area.

Accordingly, the user can simply check the usage state of the target area and also the reservation state of the target area. An area that is reserved but is left unused can be effectively used.

In addition, a seventeenth invention is configured such that the processor, depending on an operation of selecting the template image representing a not-in-use state by a user, displays information related to the current reservation state of the target area corresponding to the selected template image.

Accordingly, the user can immediately check the reservation state of the target area that the user wants to use.

In addition, an eighteenth invention is configured such that the processor executes control for canceling the information related to the current reservation state of the target area in a case where the usage state of the target area is not changed to an in-use state and a predetermined time period elapses.

Accordingly, the usage reservation of the target area that is less likely to be used can be quickly canceled.

In addition, a nineteenth invention is configured such that the processor, depending on an operation of selecting the template image representing a not-in-use state by a user, notifies a reservation holder that a usage reservation of the target area is canceled in a case where the usage reservation is already made on the target area corresponding to the selected template image.

Accordingly, the reservation holder can be prompted to cancel the usage reservation of the target area not in use.

In addition, a twentieth invention is configured such that the processor immediately cancels the usage reservation of the target area and updates the reservation information in a case where there is a response of accepting the cancelation of the usage reservation in response to the notification of canceling the usage reservation of the target area.

Accordingly, the usage reservation of the target area not in use can be quickly canceled.

In addition, a twenty-first invention is configured such that the processor cancels the usage reservation of the target area and updates the reservation information in a case where there is no response of accepting the cancelation of the usage reservation in response to the notification of canceling the usage reservation of the target area and a state where the usage state of the target area is not changed to an in-use state continues for a predetermined time period.

Accordingly, the usage reservation of the target area that is less likely to be used can be canceled.

In addition, a twenty-second invention is configured such that the processor sets the template image to be in a non-operable state or a non-display state in a case where setting for disabling the cancelation of the usage reservation of the target area is performed.

Accordingly, the user can immediately perceive that the cancelation of the usage reservation is disabled and avoid performing a useless operation.

In addition, a twenty-third invention is configured as a staying state display method of causing a processor to execute a process of obtaining a video captured by a camera installed in a facility in real time and generating display information related to a current staying state of a person in a target area usable through reservation. The method includes, by the processor, detecting staying of the person in the target area and obtaining staying information related to the staying state of the person in the target area based on the video, determining a usage state of the target area based on the staying information, obtaining reservation information related to the target area, and generating the display information including a template image representing the current usage state of the target area and information related to a current reservation state of the target area.

Accordingly, in the same manner as the sixteenth invention, the user can simply check the usage state of the target area and also the reservation state of the target area. An area that is reserved but is left unused can be effectively used.

A twenty-fourth invention for resolving the above problem is configured as a staying state display system that causes a processor to execute a process of obtaining a video captured by a camera installed in a facility and generating display information related to a staying state of a person in a target area. The processor performs object detection of detecting a template object arranged in the target area from the video, performs area setting of setting a detection area in which staying of the person is expected on the video based on a detection result of the template object, detects staying of the person in the detection area and obtains staying information related to the staying state of the person in the detection area based on the video, and generates the display information based on the staying information.

Accordingly, the template object (for example, a chair) defining the staying position of the person is detected from the video, and the detection area is set based on the detection result. Thus, even in a case where the position of the template object is changed, the staying state of the person can be accurately detected.

In addition, a twenty-fifth invention is configured such that the processor performs person detection of detecting the person from the video, and performs the object detection and the area setting at a timing when the person is not detected.

Accordingly, it is possible to avoid setting of an erroneous detection area caused by occurrence of erroneous detection of the template object due to the person present in the video.

In addition, a twenty-sixth invention is configured such that the processor performs person detection of detecting the person from the video, and performs the object detection and the area setting for a location in which the person is not detected as a target.

Accordingly, it is possible to avoid setting of an erroneous detection area caused by occurrence of erroneous detection of the template object due to the person present in the video.

In addition, a twenty-seventh invention is configured such that the processor performs the object detection and the area setting for each constant time period.

Accordingly, even in a case where the position of the template object such as a chair or a table changes, the detection area is updated at all times. Thus, staying of the person can be detected using an appropriate detection area.

In addition, a twenty-eighth invention is configured such that the processor displays a detection area image representing a range of the detection area on the video, and corrects the detection area depending on an editing operation performed on the detection area image by an operator.

Accordingly, even in a case where erroneous detection occurs in the detection of the object from the video, an appropriate detection area can be set. In the correction of the detection area, the position and size of the detection area may be changed (enlarged or reduced). In addition, a redundant detection area may be removed, and a necessary detection area may be added.

In addition, a twenty-ninth invention is configured as a staying state display method of causing a processor to execute a process of obtaining a video captured by a camera installed in a facility and generating display information related to a staying state of a person in a target area. The method includes, by the processor, performing object detection of detecting a template object arranged in the target area from the video, performing area setting of setting a detection area in which staying of the person is expected on the video based on a detection result of the template object, detecting staying of the person in the detection area and obtaining staying information related to the staying state of the person in the detection area based on the video, and generating the display information based on the staying information.

Accordingly, in the same manner as the twenty-fourth invention, even in a case where the position of the template object is changed, the staying state of the person can be accurately detected.

A thirtieth invention for resolving the above problem is configured as a staying state display system that causes a processor to execute a process of obtaining a video captured by a camera installed in a facility, displaying a staying map representing a staying state of a person in a target area, and generating the staying map depending on an editing operation performed by an operator. The processor displays an area image representing the target area and displays a person image displayed in the staying map in a list such that a display form is changed depending on the staying state of the person, and depending on the editing operation of selecting the person image and moving the person image onto the area image by the operator, generates the staying map in which the person image is arranged at an original position of each person in the area image.

Accordingly, the staying map is generated by the editing operation of selecting the person image and moving the person image onto the area image by the operator. Thus, a work of creating and updating the staying map can be efficiently performed.

In addition, a thirty-first invention is configured such that the processor detects an object that is registered in advance from the video and obtains positional information of the object in the target area, and generates the area image in which an object image representing the object is drawn based on the positional information of the object.

Accordingly, the person image can be attached to an appropriate position on the area image.

In addition, a thirty-second invention is configured such that the processor displays the object image on the video, and depending on the editing operation performed on the object image by the operator, generates the area image in which the object image is corrected.

Accordingly, even in a case where erroneous detection occurs in the detection of the object from the video, an appropriate area image can be generated. In the correction of the object image, the position and size of the object image may be changed (enlarged or reduced). In addition, a redundant object image may be removed, and a necessary object image may be added.

In addition, a thirty-third invention is configured such that the person image includes at least one of a face image, a text representing a name, and a text representing an attribute.

Accordingly, the user can simply identify the person using the person image. Particularly, in a case where the person image includes the face image, the staying state of the person can be perceived even in a case where the name of the person is not known.

In addition, a thirty-fourth invention is configured as a staying state display method of causing a processor to execute a process of obtaining a video captured by a camera installed in a facility, displaying a staying map representing a staying state of a person in a target area, and generating the staying map depending on an editing operation performed by an operator. The method includes displays an area image representing the target area and displays a person image displayed in the staying map in a list such that a display form is changed depending on the staying state of the person, and depending on the editing operation of selecting the person image and moving the person image onto the area image by the operator, generates the staying map in which the person image is arranged at an original position of each person in the area image.

Accordingly, in the same manner as the thirtieth invention, a work of creating and updating the staying map can be efficiently performed.

Hereinafter, exemplary embodiments will be described with reference to the drawings.

First Exemplary Embodiment

FIG. 1 is an overall configuration diagram of a staying state display system according to a first exemplary embodiment.

The staying state display system presents information related to a staying state of persons in each room (target area) inside a facility to a user and includes camera 1, recorder 2, facility management apparatus 3, and user terminal 4. Camera 1, recorder 2, facility management apparatus 3, and user terminal 4 are connected through a network.

Camera 1 is installed in each room (target area) inside the facility and captures each of the persons staying in each room.

Recorder 2 accumulates a video transmitted from camera 1.

Facility management apparatus 3 receives the video transmitted from camera 1 and recorder 2 and generates display information related to the staying state of each of the persons in each room (target area) inside the facility by analyzing the video.

User terminal 4 is a PC, a tablet terminal, or the like operated by the user. User terminal 4 displays a screen related to the staying state of each of the persons in each room (target area) inside the facility based on the display information transmitted from facility management apparatus 3. The user can check the staying state of each of the persons in each room inside the facility by browsing the screen.

Figure 2A:
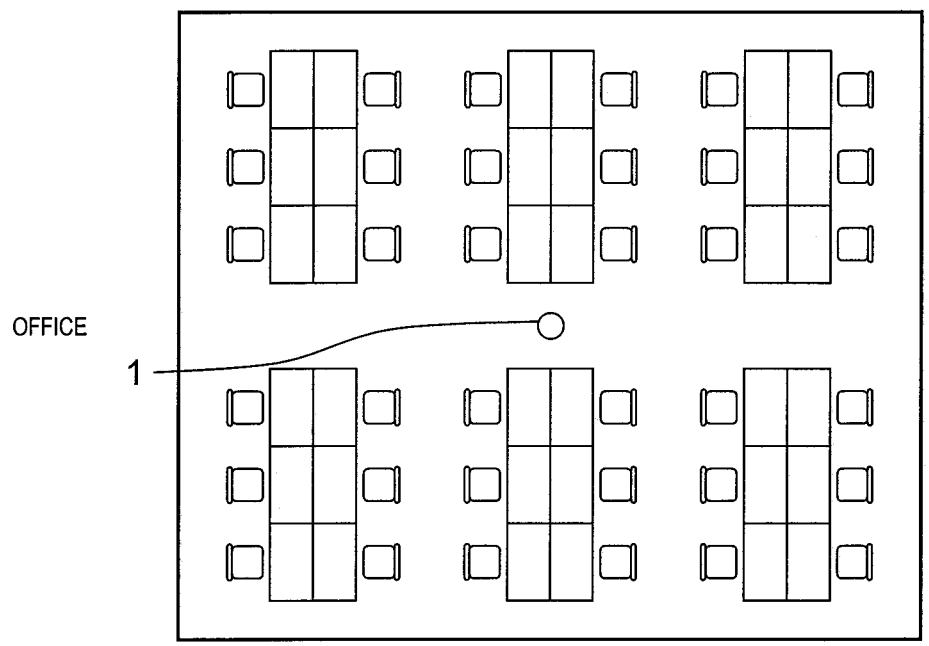
FIG. 2A is a descriptive diagram illustrating a layout of an office inside a facility and an installation state of camera 1 according to the first exemplary embodiment.
Figure 2B:
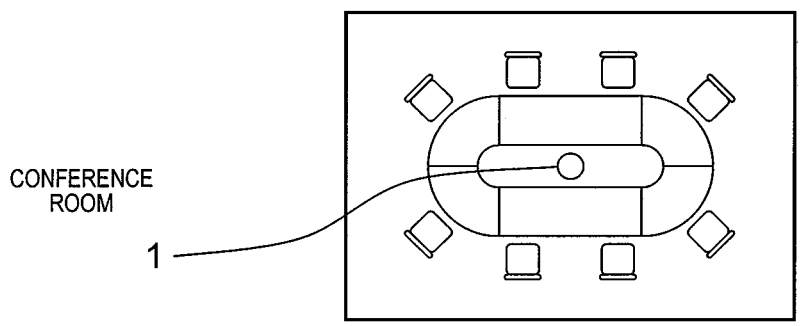
FIG. 2B is a descriptive diagram illustrating a layout of a conference room inside the facility and the installation state of camera 1 according to the first exemplary embodiment.
Figure 2C:
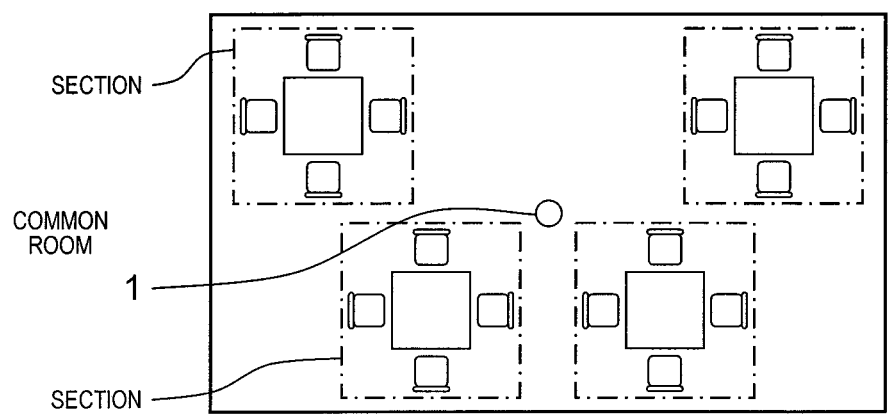
FIG. 2C is a descriptive diagram illustrating a layout of a common room inside the facility and the installation state of camera 1 according to the first exemplary embodiment.

Next, a layout of each room inside the facility and an installation state of camera 1 according to the first exemplary embodiment will be described. FIG. 2A, FIG. 2B, and FIG. 2C are descriptive diagrams illustrating the layout of each room inside the facility and the installation state of camera 1.

In the present exemplary embodiment, an office (workroom) illustrated in FIG. 2A, a conference room illustrated in FIG. 2B, and a common room illustrated in FIG. 2C are disposed in the facility.

In the office illustrated in FIG. 2A, desks and chairs are arranged in order, and each of the persons is assigned a seat configured with one pair of a desk and a chair. Each of the persons works while sitting in the person's own seat. In the conference room illustrated in FIG. 2B, a plurality of chairs are arranged around one table, and one group rents and uses the whole room. In the common room illustrated in FIG. 2C, a plurality of tables are arranged, and a plurality of chairs are arranged around each table. One section (divided area) is formed with one table and the plurality of chairs around the table. One group rents and uses one section.

Camera 1 is installed on the ceiling of each room of the office, the conference room, and the common room and captures each of the persons staying in each room. In this case, an omnidirectional camera that captures a range of 360 degrees using a fisheye lens may be employed as camera 1. A box camera that captures a range of a predetermined angle of view can also be used.

Figure 3A:
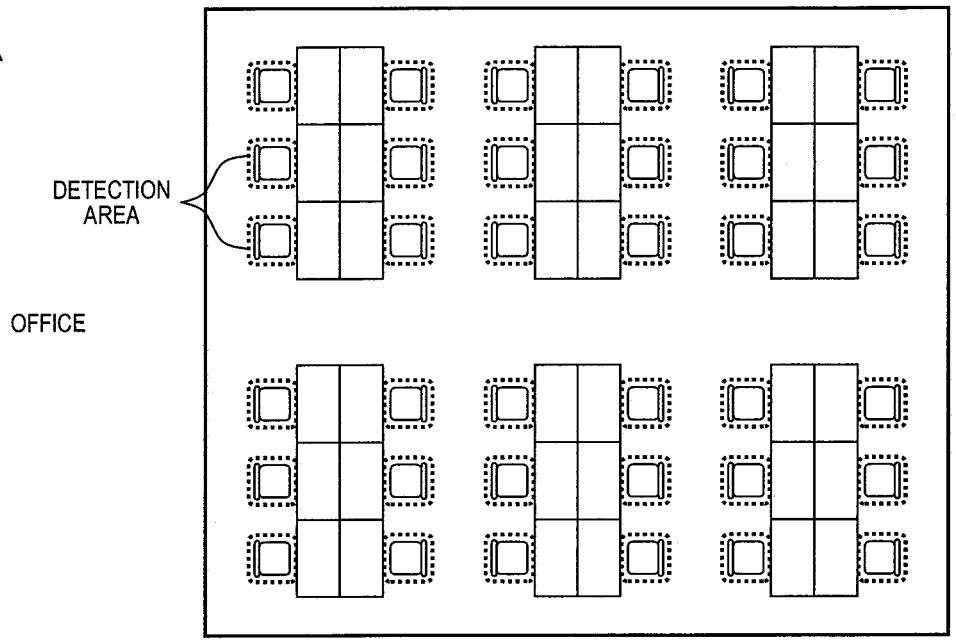
FIG. 3A is a descriptive diagram illustrating a setting state of detection areas on a video of camera 1 in the office according to the first exemplary embodiment.
Figure 3B:
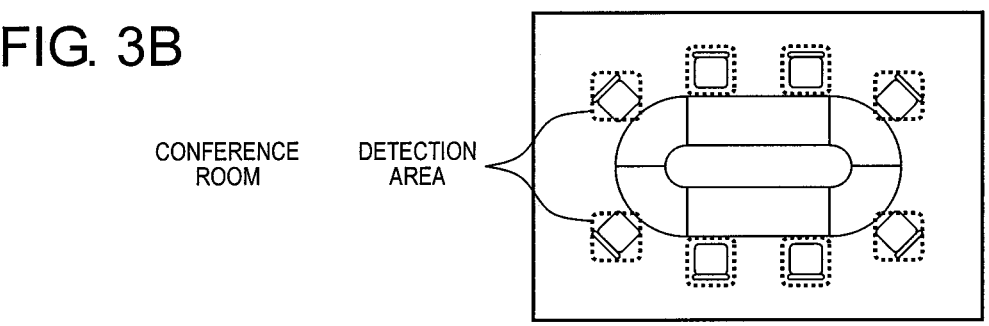
FIG. 3B is a descriptive diagram illustrating the setting state of the detection areas on the video of camera 1 in the conference room according to the first exemplary embodiment.
Figure 3C:
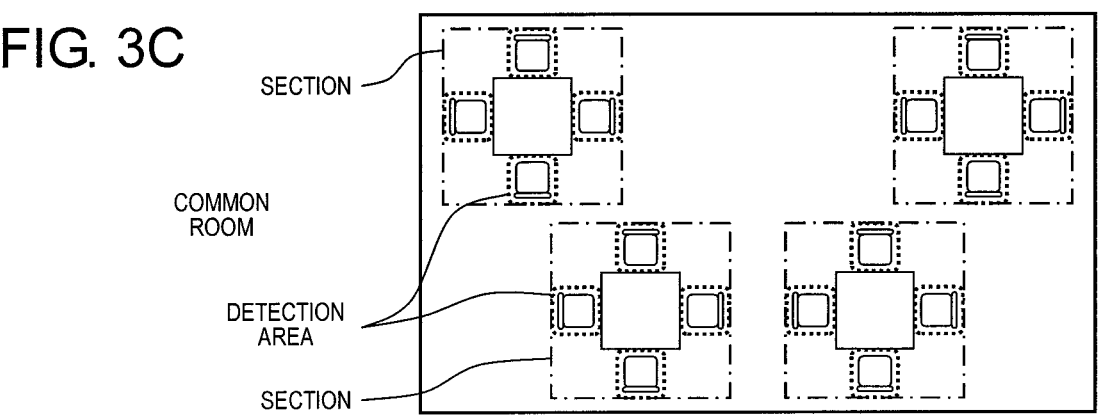
FIG. 3C is a descriptive diagram illustrating the setting state of the detection areas on the video of camera 1 in the common room according to the first exemplary embodiment.

Next, a setting state of detection areas on the video of camera 1 according to the first exemplary embodiment will be described. FIG. 3A, FIG. 3B, and FIG. 3C are descriptive diagrams illustrating the setting state of the detection areas on the video of camera 1.

In the present exemplary embodiment, the detection areas (rectangular areas of dotted lines) are set in advance on the video of camera 1 as illustrated in FIG. 3A, FIG. 3B, and FIG. 3C. Each of the detection areas is set at a position where a body of each of the persons sitting in each of the seats is expected to be present. Each of the detection areas is set based on the size of the body of each of the persons such that one detection area corresponds to one person.

In addition, in the present exemplary embodiment, a seat occupancy detection process is performed based on the detection areas set on the video of camera 1. In the seat occupancy detection process, staying of each of the persons in each of the detection areas on the video is detected, and staying information related to the staying state of each of the persons in each of the detection areas is obtained.

In the present exemplary embodiment, the display information on which the staying information is reflected in accordance with a display item corresponding to a room attribute (area attribute), specifically, each of the office (workroom), the conference room, and the common room, set in advance in each room (target area) is generated.

As illustrated in FIG. 3A, in the case of the office (first area attribute), the staying state of each of the persons in each of the detection areas, that is, the seat occupancy state of each of the seats, is used as the display item. The seat occupancy state related to whether or not each of the persons occupies each of the seats is displayed based on the staying information.

As illustrated in FIG. 3B, in the case of the conference room (second area attribute), the display information is generated using a usage state of an aggregate area in which a plurality of detection areas are aggregated as the display item. Particularly, the usage state of the whole one room (target area) is used as the display item. The usage state related to whether or not each room is in use is displayed. At this point, a determination as to whether or not each room is in use is performed based on the staying information using the whole room (target area) as one determination area. In a case where staying of one or more persons is detected in one room, it may be determined that the room is in use.

As illustrated in FIG. 3C, in the case of the common room (third area attribute), the display information is generated using the usage state of the aggregate area in which a plurality of detection areas are aggregated as the display item in the same manner as the conference room. Particularly, the usage state of each of the plurality of sections (divided areas) set in one room (target area) is used as the display item. The usage state related to whether or not each of the sections is in use is displayed. At this point, a determination as to whether or not each of the sections is in use is performed based on the staying information using one section including a plurality of detection areas as one determination area. In a case where staying of one or more persons is detected in one section, it may be determined that the section is in use.

The detection areas may be set by causing the user to perform an operation of designating the range of the detection areas on the screen displaying the video of camera 1. Alternatively, in the same manner as a fourth exemplary embodiment below, objects (chairs and desks) may be detected from the video of camera 1, and the detection areas may be set based on the detection result.

Figure 4:
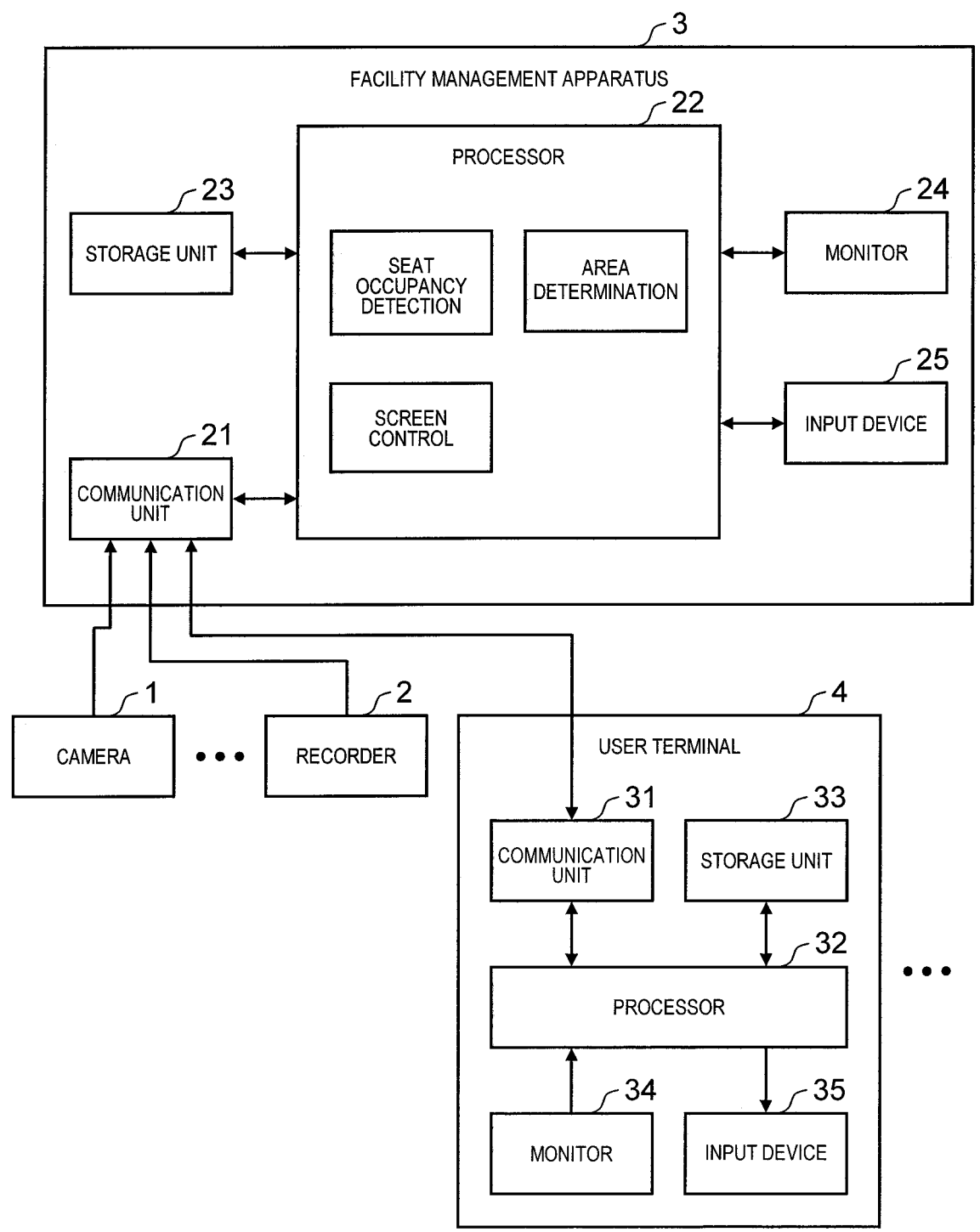
FIG. 4 is a block diagram illustrating a schematic configuration of facility management apparatus 3 and user terminal 4 according to the first exemplary embodiment.

Next, a schematic configuration of facility management apparatus 3 and user terminal 4 according to the first exemplary embodiment will be described. FIG. 4 is a block diagram illustrating a schematic configuration of facility management apparatus 3 and user terminal 4.

Facility management apparatus 3 includes communication unit 21, processor 22, storage unit 23, monitor 24 (display apparatus), and input device 25.

Communication unit 21 communicates with camera 1 and recorder 2 and receives the video transmitted from camera 1 and recorder 2.

Storage unit 23 stores the video received by communication unit 21, various setting information such as setting information related to the detection areas and setting information (refer to FIG. 5) related to the camera, a program executed by processor 22, and the like.

A screen (not illustrated) and the like for inputting the detection areas are displayed on monitor 24. An operator performs an operation and the like of inputting the detection areas in input device 25.

Processor 22 performs various processes by executing the program stored in storage unit 23. In the present exemplary embodiment, each process of seat occupancy detection, area determination, and screen control is performed.

In the seat occupancy detection process, staying of each of the persons in each of the detection areas where staying of each of the persons is expected and which are set in advance on the video is detected for each constant time period based on the video of camera 1, and the staying information related to the staying state of each of the persons in each of the detection areas for each constant time period is obtained.

In the present exemplary embodiment, whether or not each of the persons occupies each of the seats is detected based on a change state of the video in each of the detection areas from the fact that any change occurs in the video in a case where each of the persons stays. Specifically, first, the video of each of the detection areas at each time is cut from the video at each time in a predetermined sampling cycle (for example, one minute). A video change rate is obtained for the video of each of the detection areas at each time. At this point, the video change rate with respect to the video at the immediately previous time is obtained by comparing the video of each of the detection areas with the video at the immediately previous time in the sampling cycle. Next, whether or not each of the persons stays in each of the detection areas is determined based on the video change rate at each time. The staying information representing whether or not each of the persons stays at each time in the sampling cycle is generated based on the determination result. In the seat occupancy detection process, a discriminator that learns two classes of a seat occupancy state and an absence state in advance can be used based on deep learning. In the seat occupancy detection process, a determination of any of seat occupancy and absence can be performed by obtaining the likelihood (probability) of the seat occupancy state and the likelihood of the absence state with respect to an image of each of the detection areas and comparing two likelihoods by the discriminator.

In the area determination process, the usage state of the aggregate area in which a plurality of detection areas are aggregated is determined based on the staying information depending on the room attribute (area attribute). That is, the usage state related to whether or not each room is in use is determined for a room in which one group exclusively uses the whole room like the conference room. In addition, the usage state related to whether or not each section is in use is determined for a room in which a plurality of sections are set in the target area like the common room.

In the screen control process, a screen displayed on user terminal 4 is controlled. In the present exemplary embodiment, the display information related to a staying state presentation screen (refer to FIG. 6, FIG. 7A, and FIG. 7B) is generated. The staying state presentation screen is updated for each constant time period depending on the detection result (staying information) of the seat occupancy detection and the determination result of the area determination.

In facility management apparatus 3, the current staying state can be presented to the user in real time by performing the processes using the current video obtained from camera 1. In addition, the past staying state can be presented to the user by performing the processes using the past video obtained from recorder 2. Accordingly, a manager can perceive the past usage state of each room and review the layout and the like of each room. In addition, the manager can check an improvement state in a case where the layout and the like of each room are changed.

User terminal 4 includes communication unit 31, processor 32, storage unit 33, monitor 34, and input device 35.

Communication unit 31 communicates with facility management apparatus 3. Storage unit 33 stores a program and the like executed by processor 32. Processor 32 controls the operation of each unit of user terminal 4 and transmits a display request for the staying state presentation screen (refer to FIG. 6, FIG. 7A, and FIG. 7B) to facility management apparatus 3 from communication unit 31 in response to an operation performed on input device 35 by the user. In a case where the display information related to the staying state presentation screen transmitted from facility management apparatus 3 is received by communication unit 31, the staying state presentation screen is displayed on monitor 34 based on the display information.

In a case where user terminal 4 is a tablet terminal or the like, input device 35 is a touch panel and constitutes a touch panel display in combination with a display panel as monitor 34.

Figures 5, 6:
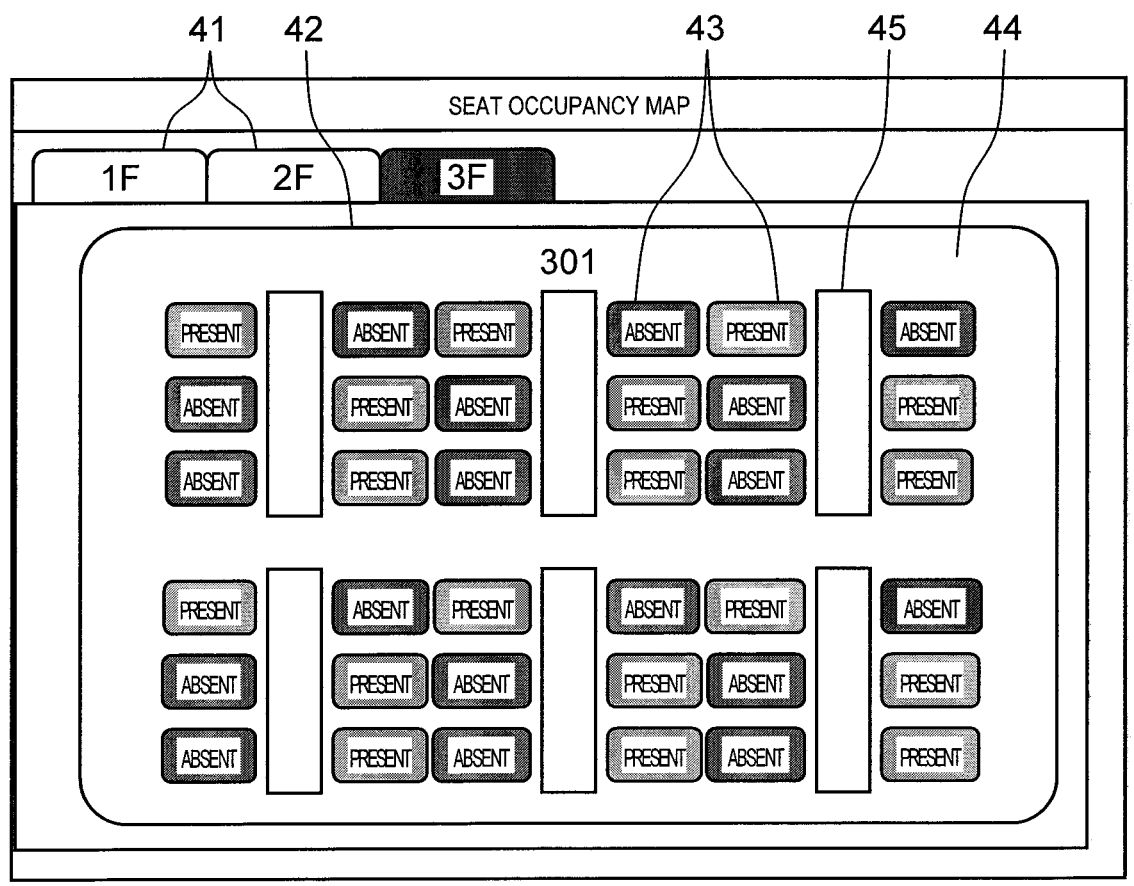
FIG. 5 is a descriptive diagram illustrating a content of camera setting information according to the first exemplary embodiment.
FIG. 6 is a descriptive diagram illustrating a seat occupancy map screen according to the first exemplary embodiment.

Next, camera setting information stored in storage unit 23 of facility management apparatus 3 according to the first exemplary embodiment will be described. FIG. 5 is a descriptive diagram illustrating a content of the camera setting information.

A camera ID, a camera name, a room number, and the room attribute (area attribute) are registered in the camera setting information. In processor 22, the room attribute of each room is obtained based on the camera setting information, and the display information is generated in accordance with the display item corresponding to the room attribute.

In the present exemplary embodiment, the room attribute (area attribute) is set for each room using one room as one target area. Alternatively, one room may be divided into a plurality of divided areas, and the area attribute may be set for each divided area.

Figure 7A:
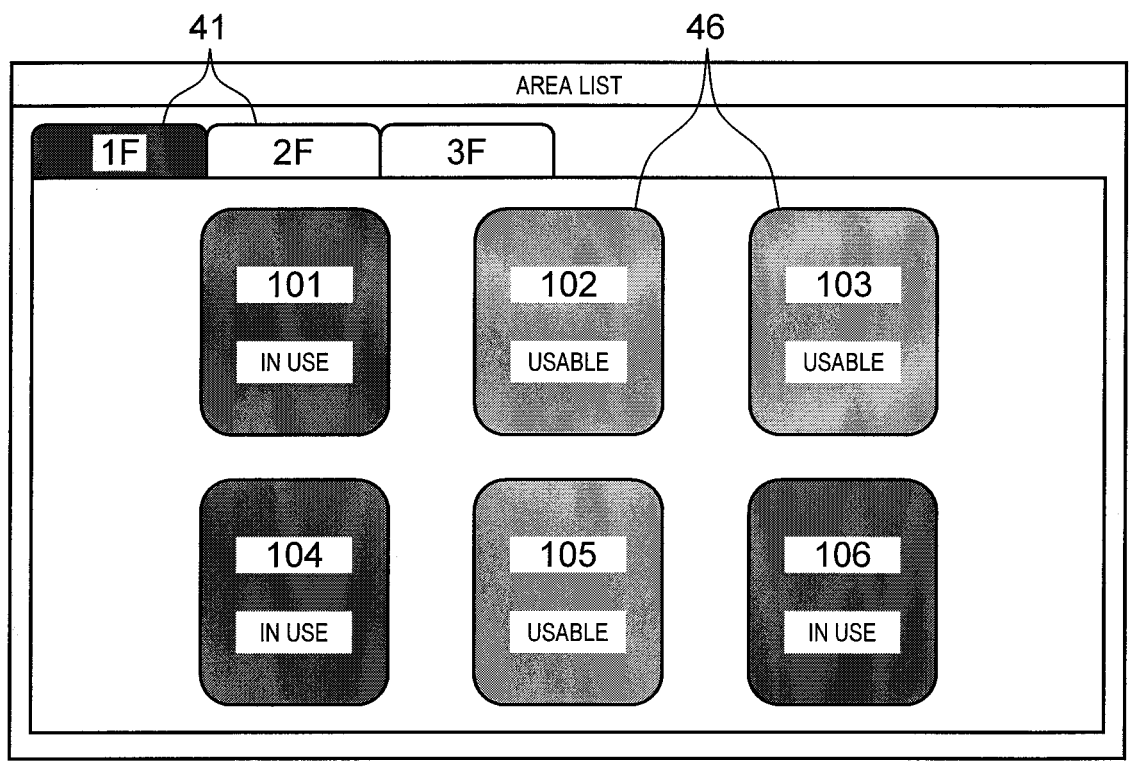
FIG. 7A is a descriptive diagram illustrating an area list screen of 1F according to the first exemplary embodiment.
Figure 7B:
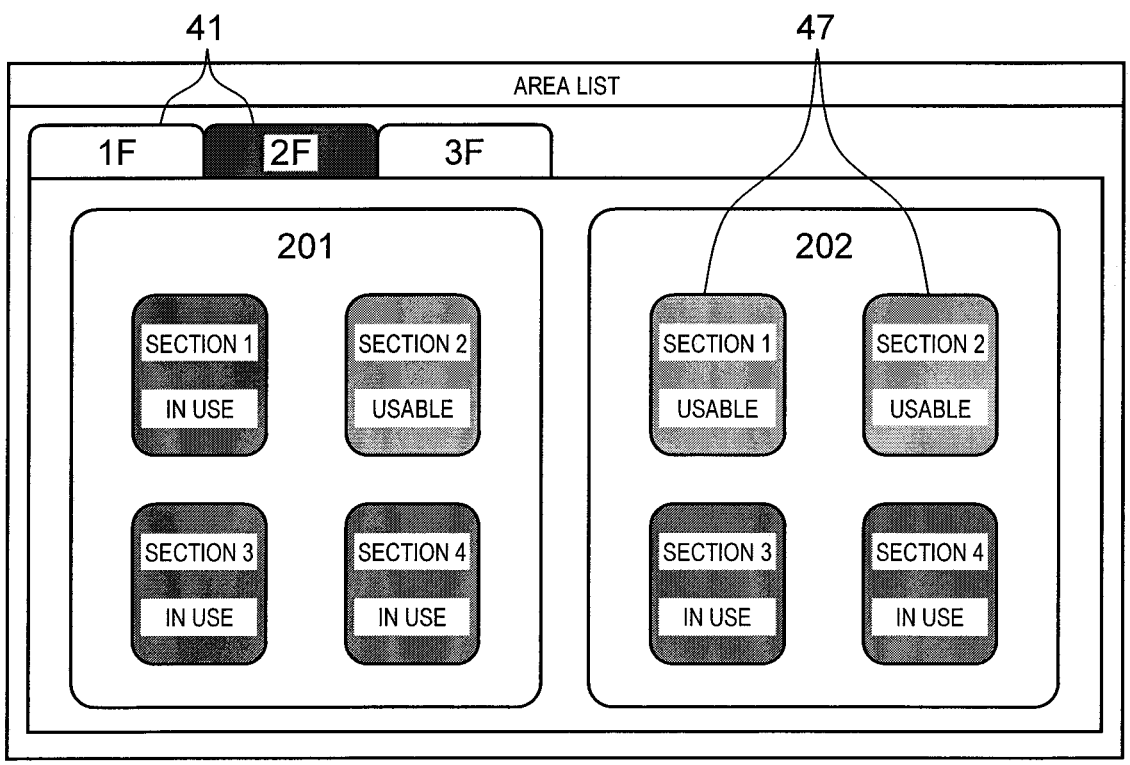
FIG. 7B is a descriptive diagram illustrating the area list screen of 2F according to the first exemplary embodiment.

Next, the staying state presentation screen displayed on user terminal 4 according to the first exemplary embodiment will be described. FIG. 6 is a descriptive diagram illustrating a seat occupancy map screen as the staying state presentation screen. FIG. 7A and FIG. 7B are descriptive diagrams illustrating an area list screen as the staying state presentation screen.

In the present exemplary embodiment, the staying state presentation screen illustrating the staying state of each of the persons in each room inside the facility is displayed on user terminal 4.

In the seat occupancy map screen illustrated in FIG. 6 and the area list screen illustrated in FIG. 7A and FIG. 7B, tab 41 of each floor (1F, 2F, and 3F) is disposed. In a case where tab 41 is selected, a screen of the selected floor is displayed. In the case of the office (3F), a transition is made to the seat occupancy map screen illustrated in FIG. 6 by selecting a room in the same screen as an area list screen (refer to FIG. 9) illustrated in a second exemplary embodiment.

In the office (workroom), the seat occupancy state of each of the persons in each of the detection areas set for each of the seats is used as the display item. As illustrated in FIG. 6, seat occupancy map 42 (staying map) representing the seat occupancy state (staying state) of each of the persons is displayed on the seat occupancy map screen as the staying state presentation screen in the office. In seat occupancy map 42, seat icon 43 (template image) representing the seat occupancy state of each of the seats is superimposed on area map 44 (map image) representing the layout of the office (target area). Images 45 of desks are drawn in area map 44.

A text of "present" or "absent" is displayed in each of seat icons 43 depending on the seat occupancy state (seat occupancy and absence). In addition, the color of each of seat icons 43 changes depending on the seat occupancy state. In the case of seat occupancy, each of seat icons 43 is displayed in red. In the case of absence, each of seat icons 43 is displayed in green. This display form of each of seat icons 43 in the office is not for limitation purposes. Any display form enabling the seat occupancy state (seat occupancy and absence) to be identified may be used. A person icon and the like below can be used.

In the conference room, the usage state of the whole conference room (target area) is used as the display item. As illustrated in FIG. 7A, area icon 46 representing the usage state of each conference room is displayed in the area list screen. A text of "in use" or "usable" is displayed in each of area icons 46 depending on the usage state. In addition, the color of each of area icons 46 changes depending on the usage state. In a case where each of the conference rooms is in use, each of area icons 46 is displayed in red. In a case where each of the conference rooms is in a vacant state and is usable, each of area icons 46 is displayed in green.

In the common room, the usage state of each of the plurality of sections (divided areas) set in the common room (target area) is used as the display item. As illustrated in FIG. 7B, section icon 47 representing the usage state of each of the sections is displayed in the area list screen. A text of "in use" or "usable" is displayed in each of section icons 47 depending on the usage state. In addition, the color of each of section icons 47 changes depending on the usage state. In a case where each of the sections is in use, each of section icons 47 is displayed in red. In a case where each of the sections is in a vacant state and is usable, each of section icons 47 is displayed in green.

In the present exemplary embodiment, seat icons 43 are superimposed on area map 44 representing the layout of the office in the staying state presentation screen (seat occupancy map screen) of the office illustrated in FIG. 6. Alternatively, seat icons 43 may be superimposed on the video of camera 1. In this case, a process of correcting distortion of the video may be performed.

Second Exemplary Embodiment

Figure 8:
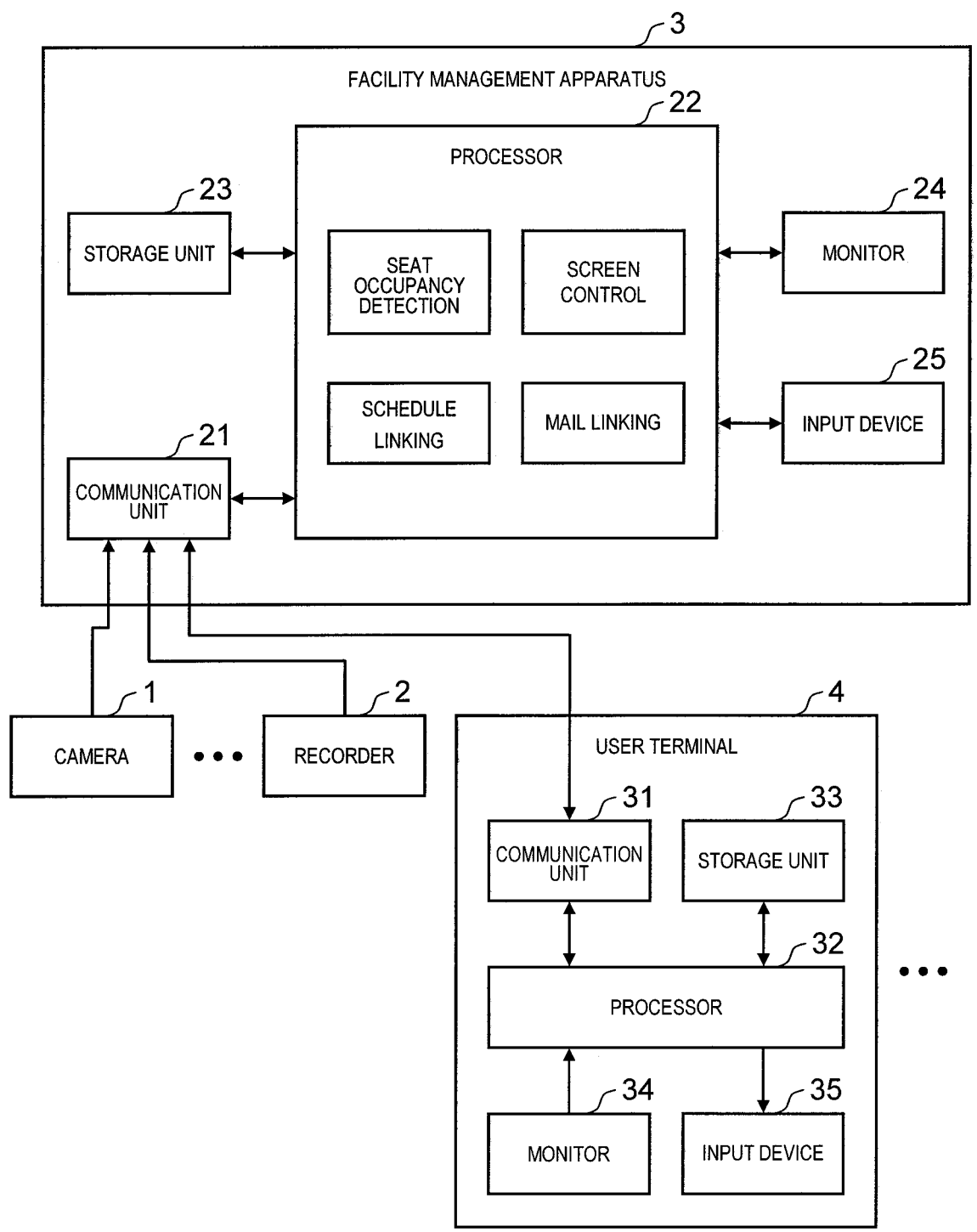
FIG. 8 is a block diagram illustrating a schematic configuration of facility management apparatus 3 and user terminal 4 according to a second exemplary embodiment.

Next, a second exemplary embodiment will be described. Points not particularly mentioned here are the same as the above exemplary embodiment. FIG. 8 is a block diagram illustrating a schematic configuration of facility management apparatus 3 and user terminal 4 according to the second exemplary embodiment.

In the first exemplary embodiment, the seat occupancy map (refer to FIG. 6) is displayed. While the seat occupancy state of each of the persons in the office can be checked in the seat occupancy map, each of the persons cannot be simply identified. Therefore, in the present exemplary embodiment, a person icon including a face image of each of the persons is displayed in the seat occupancy map. Thus, the seat occupancy state of each of a plurality of persons can be checked at once, and each of the persons can be simply identified.

Facility management apparatus 3 includes communication unit 21, processor 22, storage unit 23, monitor 24, and input device 25 in the same manner as the first exemplary embodiment.

Communication unit 21, storage unit 23, monitor 24, and input device 25 are the same as the first exemplary embodiment. Storage unit 23 further stores schedule information related to each of the persons.

Processor 22 performs each process of the seat occupancy detection and the screen control in the same manner as the first exemplary embodiment. Processor 22 further performs each process of schedule linking and mail linking. The seat occupancy detection process is the same as the first exemplary embodiment.

In the screen control process, the display information related to the area list screen (refer to FIG. 9) and the seat occupancy map screen (refer to FIG. 10) is generated.

In the schedule linking process, the schedule information related to each of the persons is obtained from the storage unit, and the schedule information is displayed on the screen in response to an operation performed on the seat occupancy map screen (refer to FIG. 10) by the user.

In the mail linking process, a mail application program that is installed on user terminal 4 is started, and an electronic mail creating screen is displayed on user terminal 4 in response to an operation performed on the seat occupancy map screen (refer to FIG. 10) performed by the user.

In the present exemplary embodiment, facility management apparatus 3 stores the schedule information related to each of the persons. Alternatively, the schedule information may be obtained from an apparatus dedicated to schedule management. In addition, facility management apparatus 3 itself may perform the schedule management.

User terminal 4 includes communication unit 31, processor 32, storage unit 33, monitor 34, and input device 35 in the same manner as the first exemplary embodiment.

Communication unit 31 communicates with facility management apparatus 3. Storage unit 33 stores a program and the like executed by processor 32. Processor 32 controls the operation of each unit of user terminal 4 and transmits a display request for the area list screen (refer to FIG. 9) and the seat occupancy map screen (refer to FIG. 10) to facility management apparatus 3 from communication unit 31 in response to an operation performed on input device 35 by the user. In a case where the display information related to the area list screen and the staying state presentation screen transmitted from facility management apparatus 3 is received by communication unit 31, the area list screen and the staying state presentation screen are displayed on monitor 34 based on the display information.

In addition, processor 32 executes the mail application program stored in storage unit 33 and displays the electronic mail creating screen on monitor 34 in response to an operation performed on the seat occupancy map screen (refer to FIG. 10) by the user.

Figure 9:
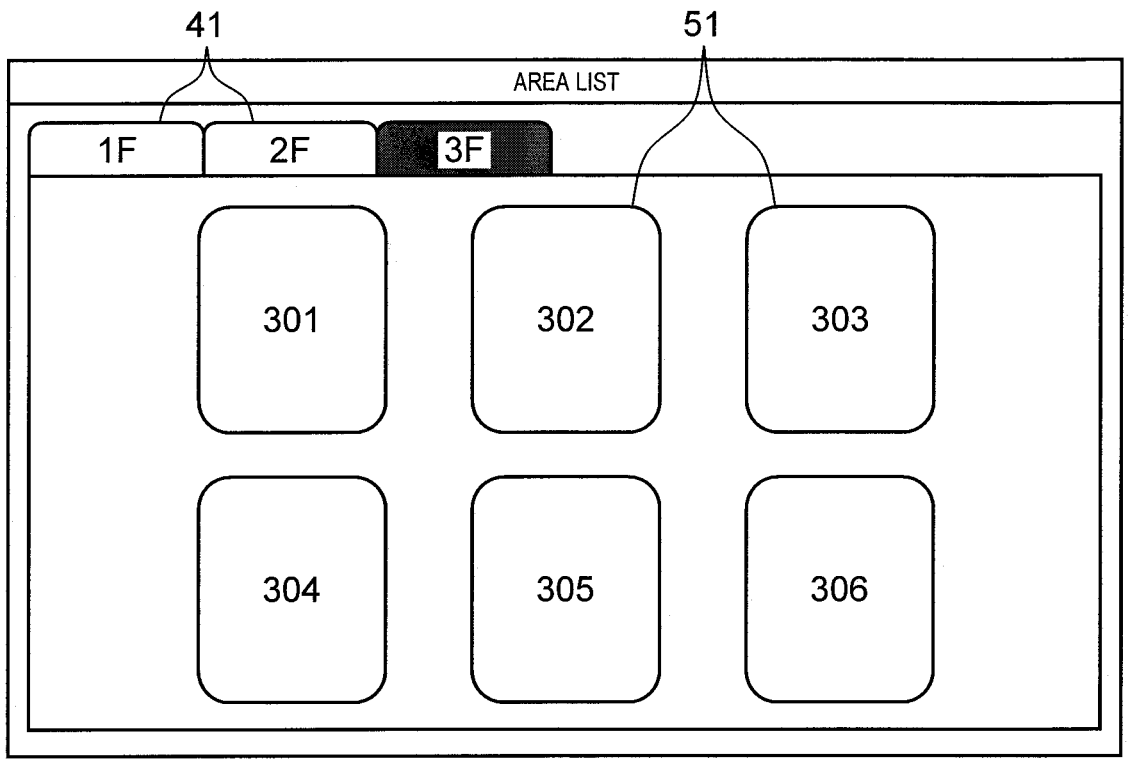
FIG. 9 is a descriptive diagram illustrating an area list screen according to the second exemplary embodiment.

Next, the area list screen displayed on user terminal 4 according to the second exemplary embodiment will be described. FIG. 9 is a descriptive diagram illustrating the area list screen.

Tab 41 of each floor (1F, 2F, and 3F) is disposed in the area list screen. In a case where tab 41 is selected, the area list screen of the selected floor is displayed. In a case where tab 41 of the floor (3F) on which offices (workrooms) are present is selected, a plurality of area icons 51 each of which represents an office (target area) are displayed in order.

In the area list screen, in a case where the user performs an operation of a screen transition by selecting area icon 51 of a room in which the seat of a person of which the user wants to check the seat occupancy state is present, a transition is made to the seat occupancy map screen (refer to FIG. 10), and the seat occupancy state of each of the persons in the selected room is displayed in the seat occupancy map screen.

For example, in a case where input device 35 is a mouse, performing a scroll operation, that is, overlaying a pointer on each of area icons 51 and operating a scroll button of the mouse, as an operation of a screen transition enlarges each of area icons 51, and a transition is made to the seat occupancy map screen. In addition, in a case where input device 35 is a touch panel, a pinch-out or swipe operation may be performed.

Figure 10:
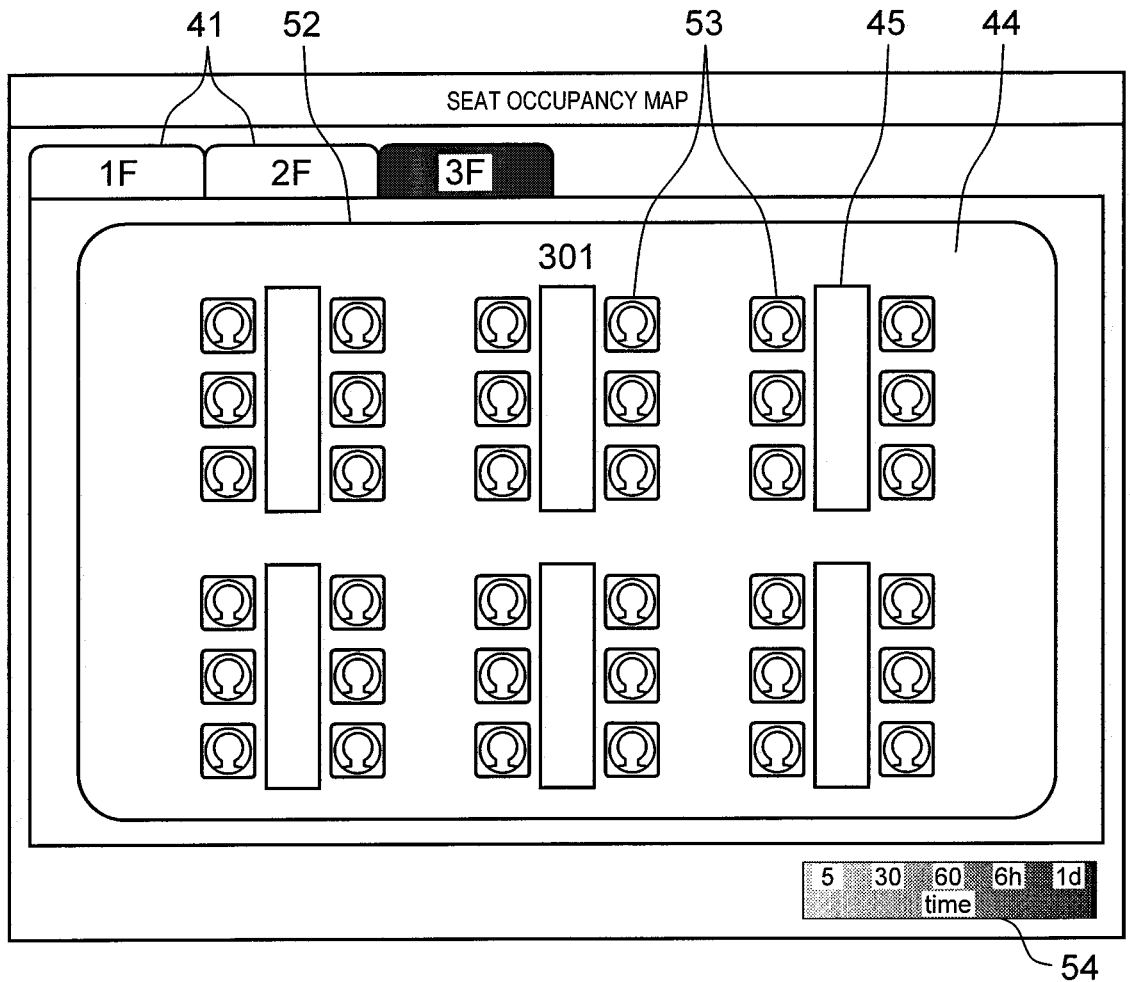
FIG. 10 is a descriptive diagram illustrating a seat occupancy map screen according to the second exemplary embodiment.
Figure 11A:
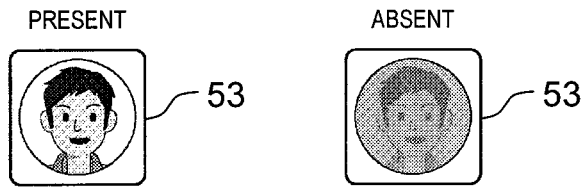
FIG. 11A is a descriptive diagram illustrating a change state (seat occupancy and absence) of a person icon according to the second exemplary embodiment.
Figure 11B:
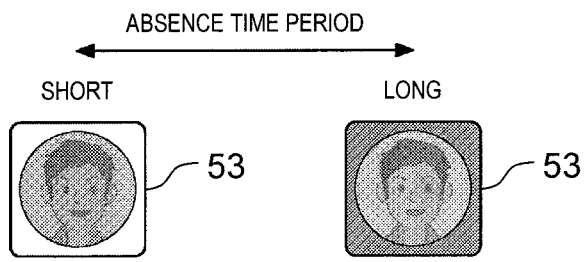
FIG. 11B is a descriptive diagram illustrating the change state (absence time period) of the person icon according to the second exemplary embodiment.
Figure 12A:
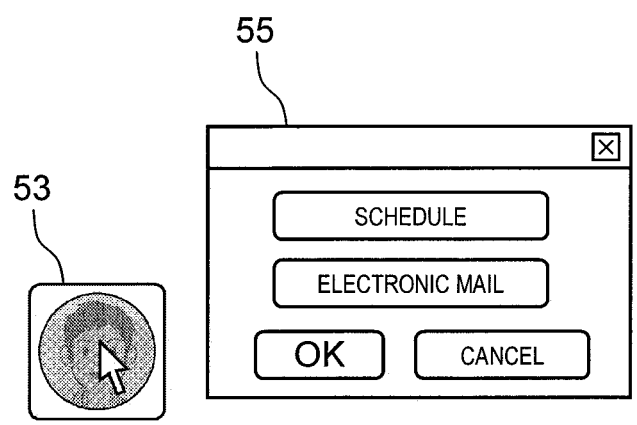
FIG. 12A is a descriptive diagram illustrating a pop-up menu in the seat occupancy map screen according to the second exemplary embodiment.
Figure 12B:
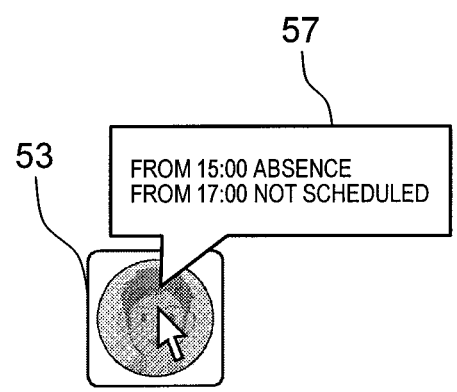
FIG. 12B is a descriptive diagram illustrating a tooltip display in the seat occupancy map screen according to the second exemplary embodiment.

Next, the seat occupancy map screen displayed on user terminal 4 according to the second exemplary embodiment will be described. FIG. 10 is a descriptive diagram illustrating the seat occupancy map screen. FIG. 11A and FIG. 11B are descriptive diagrams illustrating a change state of person icon 53. FIG. 12A and FIG. 12B are descriptive diagrams illustrating a main part of the seat occupancy map screen.

As illustrated in FIG. 10, seat occupancy map 52 (staying map) that represents the seat occupancy state (staying state) of each of the persons is displayed in the seat occupancy map screen. In seat occupancy map 52, person icon 53 (person image) of each of the persons of which the seats are present in the target room are superimposed on area map 44 (map image) representing the layout of the office (target area). Images 45 of desks are drawn in area map 44.

Each of person icons 53 is displayed at a position corresponding to the seat of each of the persons, specifically, the position of the chair in which each of the persons sits. The face image (captured image of the face) of each of the persons is embedded in each of person icons 53. Accordingly, each of the persons can be easily identified.

In the present exemplary embodiment, a transition is made to the seat occupancy map screen by selecting a room (target area) in the area list screen (refer to FIG. 9). Alternatively, a department list representing an organizational configuration may be displayed, and one department may be selected from the department list. Thus, the seat occupancy map screen of a room in which the selected department is present may be displayed.

In addition, in the present exemplary embodiment, each of person icons 53 in which the face image is embedded is arranged on area map 44 as a person image for identifying each of the persons. Alternatively, each of the person images may be an image (a portrait or an avatar) in which features of the appearance of each of the persons are schematically drawn. In addition, each of the person images may be an image in which a text for identifying each of the persons, that is, a text representing the name of each of the persons or attributes (belonging and a title) of each of the persons, is drawn.

As illustrated in FIG. 11A and FIG. 11B, the display form of person icon 53 changes depending on the seat occupancy state of the person. In the example illustrated in FIG. 11A, the color of the face image of person icon 53 changes depending on seat occupancy. Specifically, at the time of seat occupancy, each face image is displayed in color. At the time of absence, each face image is displayed in gray. Accordingly, the user can immediately check whether or not each of the persons occupies each of the seats.

In addition, in the case of absence at the current time, the display form of each of person icons 53 changes depending on an absence time period. In the example illustrated in FIG. 11B, the color of a part of person icon 53 other than the face image changes depending on seat occupancy. For example, in a case where the absence time period is short, the part is displayed in blue. In a case where the absence time period is long, the part is displayed in red. The color of the part changes from blue to red along with an increase in absence time period.

The absence time period includes the past absence time period, that is, a time period from a time point at which each of the persons leaves each of the seats until the current time point, and the future absence time period (expected absence time period), that is, a time period from the current time point until a time period at which each of the persons is expected to return to each of the seats. The user can designate any of the absence time periods in which person icon 53 is displayed. The past absence time period can be calculated based on the staying information obtained by the seat occupancy detection. In addition, the future absence time period can be calculated from the schedule information.

In the seat occupancy map screen illustrated in FIG. 10, legend 54 that shows the length of the absence time period represented by the color of each of person icons 53 is displayed.

In addition, in the seat occupancy map screen, in a case where a predetermined operation is performed on each of person icons 53, a transition is made to a schedule screen (not illustrated), and the schedule of each of the persons can be checked. In the example illustrated in FIG. 12A, in a case where "schedule" is selected in pop-up menu 55 that is displayed by performing a left click operation on person icon 53, a transition is made to the schedule screen of the person. Accordingly, the user can check the schedule of the person.

In addition, in a case where a predetermined operation is performed on person icon 53, a transition is made to the mail creating screen (not illustrated), and an electronic mail having the person as a recipient can be created. In the example illustrated in FIG. 12A, in a case where "electronic mail" is selected in pop-up menu 55, a transition is made to the mail creating screen. An address of the recipient is set in advance in the mail creating screen. Thus, an effort of inputting the address can be reduced.

The "schedule" or "electronic mail" may be set to be selectable in a list box (not illustrated) that is displayed by performing a right click operation on each of the person icons 53. In addition, in a case where input device 35 is a touch panel like a case where user terminal 4 is a tablet terminal, a transition to the schedule screen and the mail creating screen may be made by operations such as tap, double tap, and long tap (long press).

In addition, in a case where a predetermined operation is performed on person icon 53, the past and future seat occupancy states of the person is displayed. In the example illustrated in FIG. 12B, tooltip 57 is displayed by a mouseover operation of overlaying the pointer on person icon 53. The past seat occupancy state, that is, information (absence from 15:00) representing the start of absence, and the future seat occupancy state, that is, information (not scheduled from 17:00) representing the start of seat occupancy (end of absence) are described in tooltip 57. Accordingly, the user can check the past and future seat occupancy state of the person.

The past seat occupancy state of the person may be obtained from the staying information which represents whether or not the person stays at each time and is obtained in the seat occupancy detection process. In addition, the future seat occupancy state of the person may be obtained from the schedule information.

In the present exemplary embodiment, pop-up menu 55 is displayed by a left click operation. The list box (not illustrated) is displayed by a right click operation. Tooltip 57 is displayed by a mouseover operation. However, such operations are not for limitation purposes.

Third Exemplary Embodiment

Figure 13:
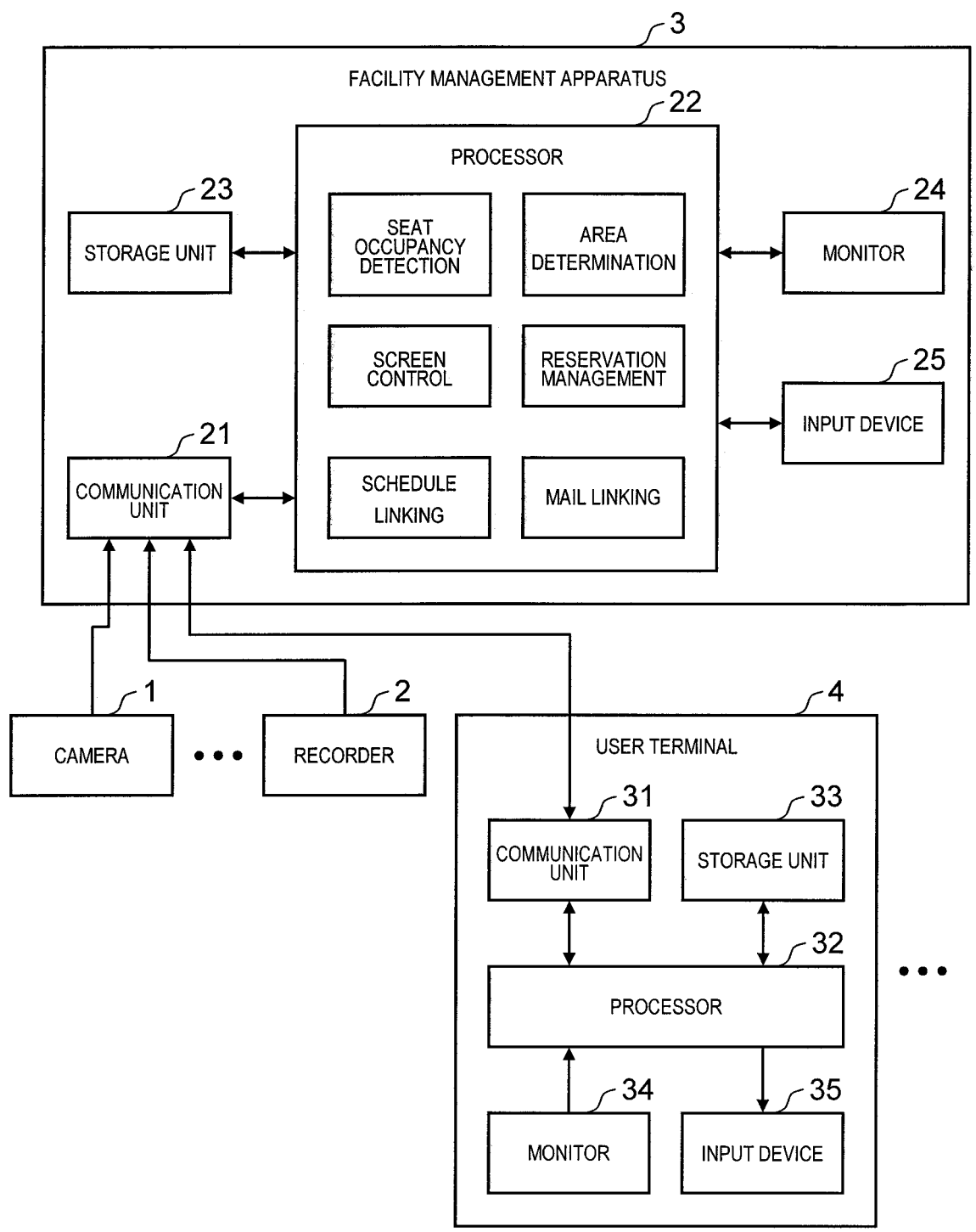
FIG. 13 is a block diagram illustrating a schematic configuration of facility management apparatus 3 and user terminal 4 according to a third exemplary embodiment.

Next, a third exemplary embodiment will be described. Points not particularly mentioned here are the same as the above exemplary embodiments. FIG. 13 is a block diagram illustrating a schematic configuration of facility management apparatus 3 and user terminal 4 according to the third exemplary embodiment.

In the first exemplary embodiment (refer to FIG. 7A), the usage state of the conference room (target area) is presented to the user. However, in a case where the conference room can be used through reservation, the conference room cannot be used in a case where the conference room is currently not in use but is reserved. Therefore, in the present exemplary embodiment, a reservation state is also presented to the user along with the usage state of the conference room.

Facility management apparatus 3 includes communication unit 21, processor 22, storage unit 23, monitor 24, and input device 25 in the same manner as the first exemplary embodiment.

Communication unit 21, storage unit 23, monitor 24, and input device 25 are the same as the first exemplary embodiment. Storage unit 23 further stores schedule information related to a usage reservation of the conference room.

Processor 22 performs each process of the seat occupancy detection, the area determination, the screen control, reservation management, the schedule linking, and the mail linking.

In the seat occupancy detection process, staying of each of the persons in each of the detection areas is detected for each constant time period based on the video of camera 1, and the staying information related to the staying state of each of the persons in the conference room for each constant time period is obtained.

In the area determination process, the staying state of each of the persons in the conference room, that is, the usage state related to whether or not the conference room is currently in use, is determined for each constant time period based on the staying information.

In the screen control process, display information related to an area list screen (refer to FIG. 14) displaying the usage state and the reservation state of the conference room (target area) is generated.

In the reservation management process, a schedule related to the usage reservation of the conference room is managed. Specifically, a process of displaying a reservation screen (not illustrated) on user terminal 4, causing the user to perform an operation of the usage reservation of the conference room, and receiving the usage reservation of the conference room in response to the operation is performed. In addition, a process of displaying a cancelation screen (not illustrated) on user terminal 4, causing the user to perform an operation of canceling the usage reservation, and updating reservation information by canceling the usage reservation in response to the operation is performed.

In addition, in the reservation management process, a cancelation disabling flag for disabling the cancelation of the usage reservation is set by designation by the user at the time of making the reservation.

In addition, in the reservation management process, a process of canceling the usage reservation of the conference room in a case where the conference room is reserved but the conference room is left unused is periodically performed.

In the schedule linking process, reservation schedule information related to the conference room is obtained from storage unit 23, and the reservation schedule information is displayed on the screen in response to an operation performed on the area list screen (refer to FIG. 14) by the user.

In the mail linking process, the mail application program that is installed on user terminal 4 is started, and the electronic mail creating screen is displayed on user terminal 4 in response to an operation performed on the area list screen (refer to FIG. 14) performed by the user.

In the present exemplary embodiment, facility management apparatus 3 manages the schedule related to the usage reservation of the conference room. Alternatively, an apparatus dedicated to reservation management may be separately disposed. In this case, the schedule information may be obtained from the apparatus dedicated to reservation management. In a case where it is necessary to cancel the usage reservation, a notification providing an instruction to cancel the usage reservation may be transmitted to the apparatus dedicated to reservation management from facility management apparatus 3.

User terminal 4 includes communication unit 31, processor 32, storage unit 33, monitor 34, and input device 35 in the same manner as the first exemplary embodiment.

Communication unit 31 communicates with facility management apparatus 3. Storage unit 33 stores a program and the like executed by processor 32. Processor 32 controls the operation of each unit of user terminal 4 and transmits a display request for the area list screen (refer to FIG. 14) to facility management apparatus 3 from communication unit 31 in response to an operation performed on input device 35 by the user. In a case where the display information related to the area list screen transmitted from facility management apparatus 3 is received by communication unit 31, the area list screen is displayed on monitor 34 based on the display information.

In addition, processor 32 executes the mail application program stored in storage unit 33 and displays the electronic mail creating screen on monitor 34 in response to an operation performed on the area list screen (refer to FIG. 14) by the user.

Figure 14:
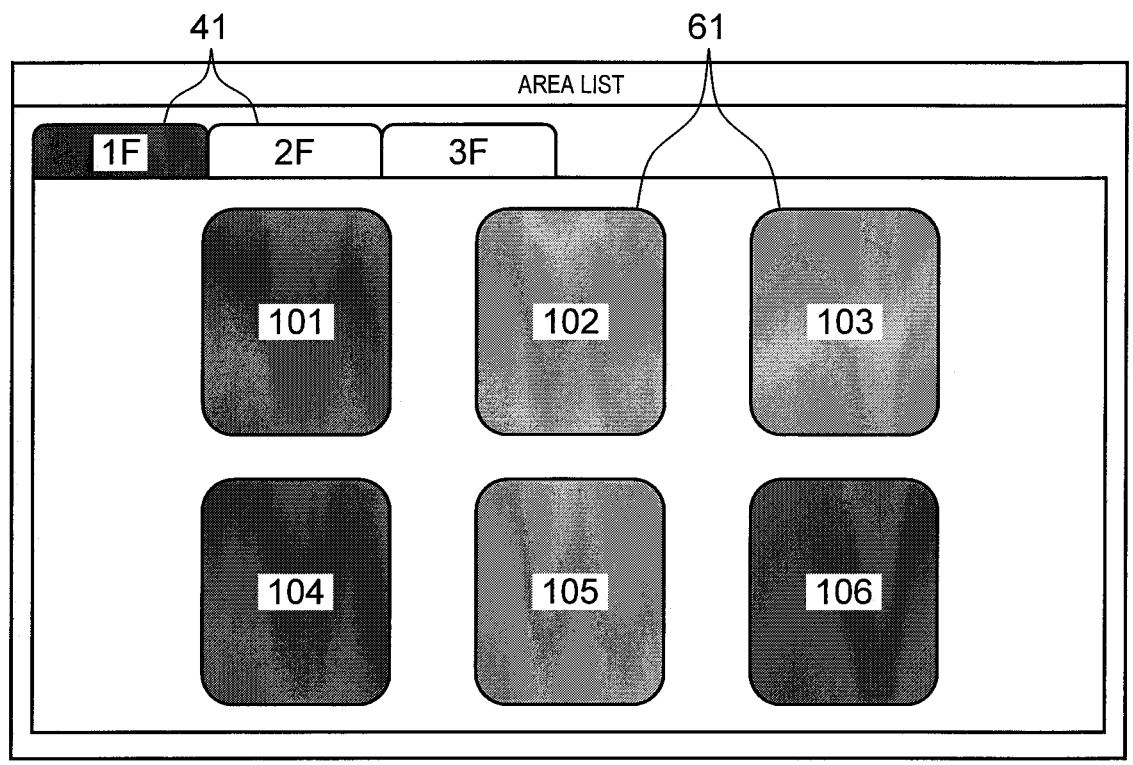
FIG. 14 is a descriptive diagram illustrating an area list screen according to the third exemplary embodiment.
Figure 15A:
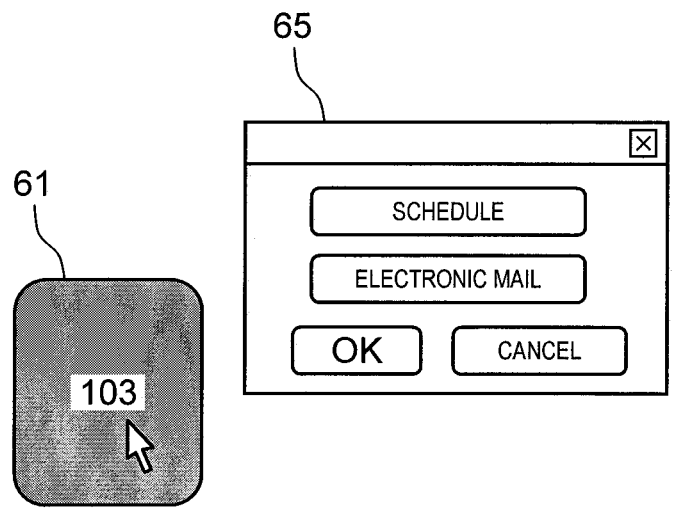
FIG. 15A is a descriptive diagram illustrating a pop-up menu in the area list screen according to the third exemplary embodiment.
Figure 15B:
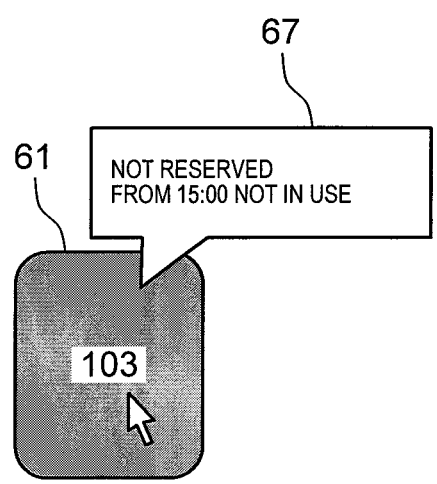
FIG. 15B is a descriptive diagram illustrating a tooltip display in the area list screen according to the third exemplary embodiment.

Next, the area list screen according to the third exemplary embodiment will be described. FIG. 14 is a descriptive diagram illustrating the area list screen. FIG. 15A and FIG. 15B are descriptive diagrams illustrating a main part of the area list screen.

As illustrated in FIG. 14, tab 41 of each floor (1F, 2F, and 3F) is disposed in the area list screen (usage state presentation screen). In a case where each of tabs 41 is selected, the area list screen of the selected floor is displayed. In a case where tab 41 of the floor (1F) on which conference rooms are present is selected, a plurality of area icons 61 (template images) each of which represents a conference room (target area) are displayed in order.

The display form of each of area icons 61 changes depending on the current usage state of each of the conference rooms. For example, in the case of an in-use state, each of area icons 61 is displayed in red. In the case of a not-in-use state, each of area icons 61 is displayed in green.

In addition, in the area list screen, in a case where a predetermined operation is performed on each of area icons 61, a transition is made to the schedule screen (not illustrated), and a reservation schedule of each of the conference rooms can be checked. In the example illustrated in FIG. 15A, in a case where "schedule" is selected in pop-up menu 65 that is displayed by performing a left click operation on area icon 61, a transition is made to a reservation schedule screen of the conference room.

In addition, in a case where a predetermined operation is performed on area icon 61, a transition is made to the mail creating screen (not illustrated), and an electronic mail having the current reservation holder of the selected conference room (target area) as a recipient can be created. In the example illustrated in FIG. 15A, in a case where "electronic mail" is selected in pop-up menu 65, a transition is made to the mail creating screen. An address of the recipient is set in advance in the mail creating screen. Thus, an effort of inputting the address can be reduced.

The "schedule" or "electronic mail" may be set to be selectable in a list box (not illustrated) that is displayed by performing a right click operation on area icon 61. In addition, in a case where input device 35 is a touch panel like a case where user terminal 4 is a tablet terminal, a transition to the reservation schedule screen and the mail creating screen may be made by operations such as tap, double tap, and long tap (long press).

In addition, in a case where a predetermined operation is performed on area icon 61, the current reservation state of the conference room (target area) is displayed. In the example illustrated in FIG. 15B, tooltip 67 is displayed by a mouseover operation of overlaying the pointer on area icon 61. The current reservation state (not reserved) of the conference room and the current usage state (not in use from 15:00) of the conference room are described in tooltip 67.

Accordingly, the user can simply check whether or not the conference room that is currently not in use is reserved. Furthermore, the user can simply check whether the conference room not in use is originally not reserved or a conference is finished earlier than is scheduled and the conference room is set to be in a vacant state.

In the present exemplary embodiment, pop-up menu 65 is displayed by a left click operation. The list box (not illustrated) is displayed by a right click operation. Tooltip 67 is displayed by a mouseover operation. However, such operations are not for limitation purposes.

Figure 16:
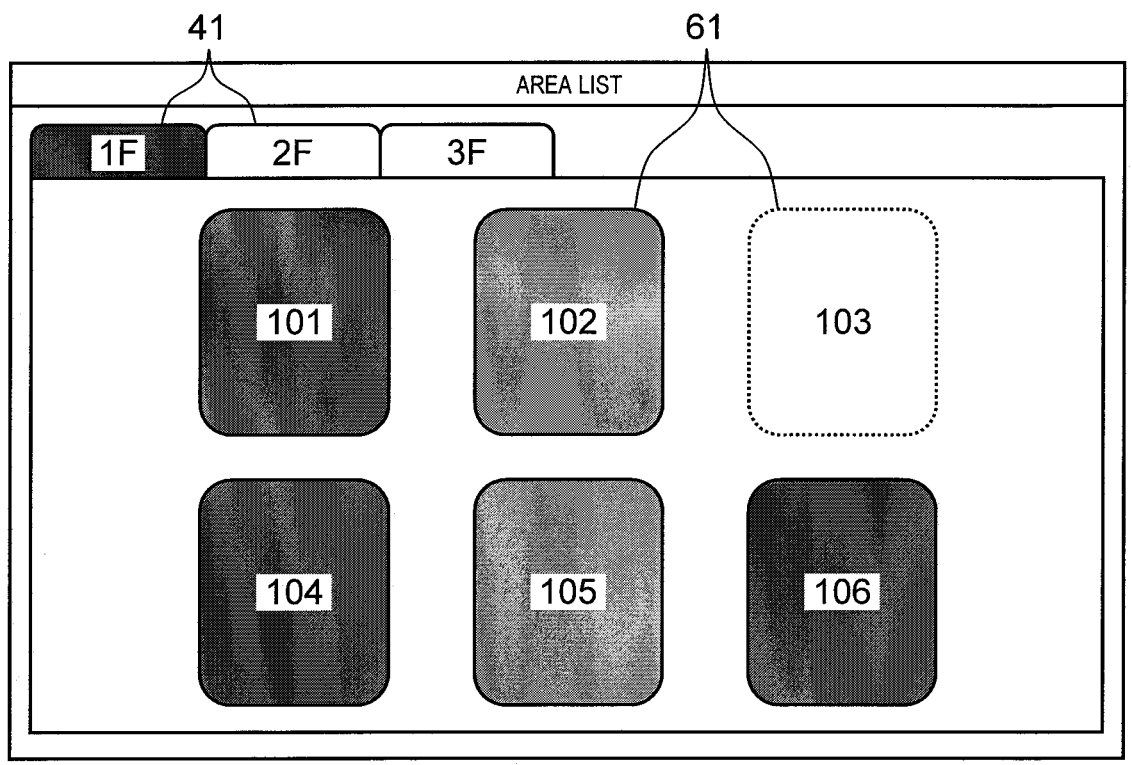
FIG. 16 is a descriptive diagram illustrating a modification example of the area list screen according to the third exemplary embodiment.

Next, a modification example of the area list screen according to the third exemplary embodiment will be described. FIG. 16 is a descriptive diagram illustrating a modification example of the area list screen.

In the example illustrated in FIG. 14, the display form (color) of area icon 61 representing each of the conference rooms (target areas) is changed depending on the current usage state of each of the conference rooms.

Alternatively, in the present modification example, in a case where the cancelation disabling flag for disabling cancelation of a reservation is set for a reserved conference room, area icon 61 is displayed in a grayed-out manner as a non-operable state.

In a case where the cancelation disabling flag is set, area icon 61 may be set to be in a non-display state.

Figure 17:
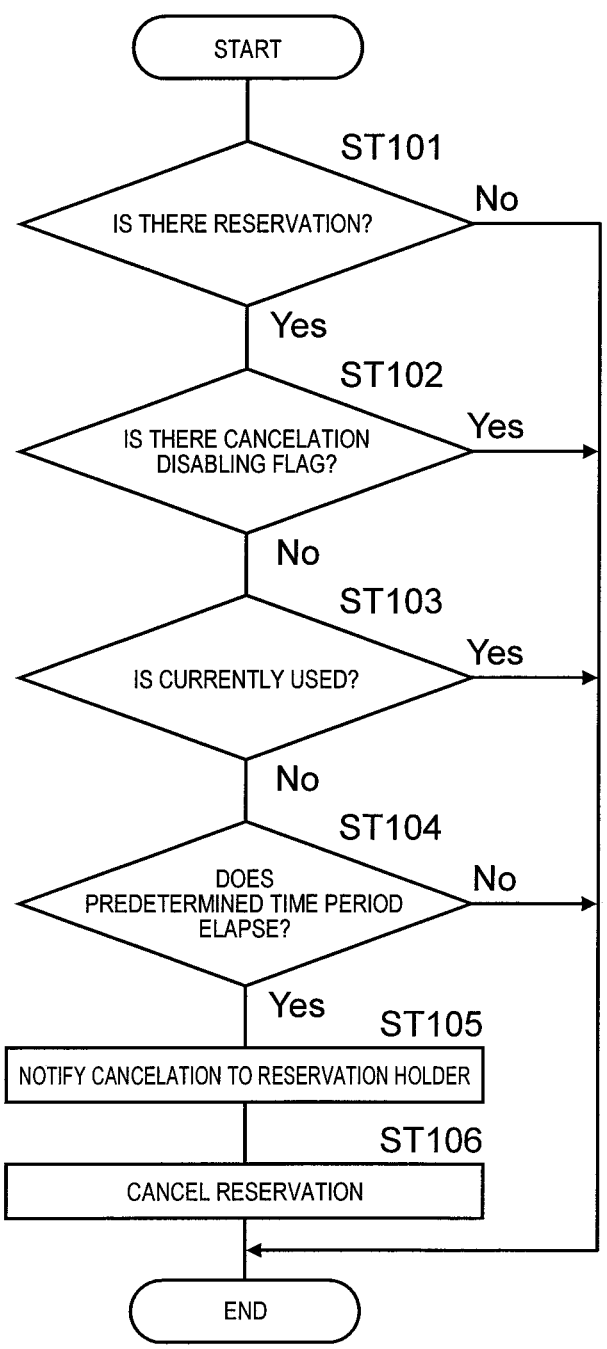
FIG. 17 is a flowchart illustrating a processing procedure of facility management apparatus 3 according to the third exemplary embodiment.

Next, a processing procedure of facility management apparatus 3 according to the third exemplary embodiment will be described. FIG. 17 is a flowchart illustrating a processing procedure of facility management apparatus 3.

In the present exemplary embodiment, a process of canceling a usage reservation of a conference room that is left not used is periodically performed. The process illustrated below is sequentially performed for each conference room as a target.

Specifically, first, a determination as to whether or not the conference room as a target is currently reserved is performed in processor 22 (ST101). In a case where the conference room as a target is currently not reserved (No in ST101), the process is finished.

In a case where the conference room as a target is currently reserved (Yes in ST101), a determination as to whether or not the cancelation disabling flag is set in the reservation is performed next (ST102). In a case where the cancelation disabling flag is set (Yes in ST102), the process is finished.

In a case where the cancelation disabling flag is not set (No in ST102), a determination as to whether or not the conference room is currently in use is performed next (ST103). In a case where the conference room is currently in use (Yes in ST103), the process is finished.

In a case where the conference room is currently not in use (No in ST103), a determination as to whether or not a predetermined time period (for example, 15 minutes) elapses while the conference room is not in use is performed next (ST104). In a case where the predetermined time period does not elapse while the conference room is not in use (No in ST104), the process is finished.

In a case where the predetermined time period elapses while the conference room is not in use (Yes in ST104), a notification (cancelation notification) of canceling the reservation is transmitted to user terminal 4 of the reservation holder by electronic mail and the like (ST105). A process of canceling the usage reservation and updating the reservation information is performed (ST106).

A case where the conference room is reserved but is not in use includes a case where the conference room is not used at all from the beginning of a reservation time period and a case where a conference is finished earlier than is scheduled and the conference room is set to be in a vacant state. Thus, in the determination of the elapse of the predetermined time period (ST104), in a case where the conference room is not used at all from the beginning of the reservation time period, the determination may be performed using an elapsed time period (leaving time period) from the start time of a reserved usage time period. In addition, in a case where the conference room is set to be in a vacant state in the middle of the reserved usage time period, the determination may be performed using the elapsed time period from the vacant state.

In a case where the reservation is canceled and the reservation information is updated, the updated reservation information is reflected on the area list screen (refer to FIG. 14) displaying the usage state of each of the conference rooms, and the cancelation of the reservation is displayed in tooltip 67 (refer to FIG. 15B) displayed by a mouseover operation.

Figure 18:
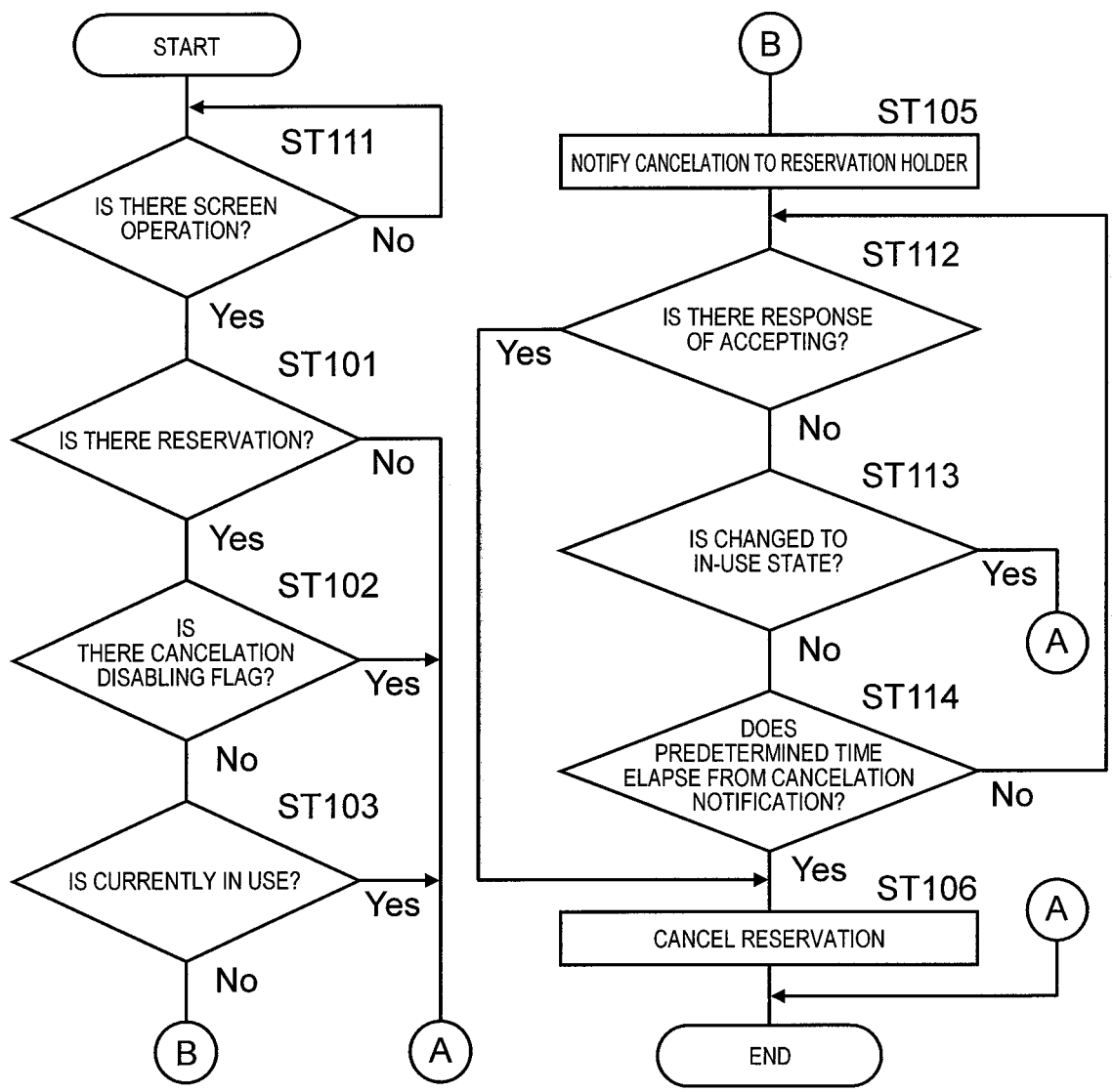
FIG. 18 is a flowchart illustrating a modification example of the processing procedure of facility management apparatus 3 according to the third exemplary embodiment.

Next, a modification example of the processing procedure of facility management apparatus 3 according to the third exemplary embodiment will be described. FIG. 18 is a flowchart illustrating a modification example of the processing procedure of facility management apparatus 3.

In the example illustrated in FIG. 17, the process of canceling the usage reservation of the conference room that is left unused is periodically performed. Alternatively, in the present modification example, the process of canceling the usage reservation of the conference room is started by causing the user to perform an operation of selecting the conference room as a trigger in the area list screen (refer to FIG. 14) displaying the usage state of each of the conference rooms.

Specifically, first, in processor 22, in a case where an operation of selecting the conference room (target area) in the area list screen (refer to FIG. 14), specifically, a click or mouseover operation with respect to area icon 61, is detected (Yes in ST111), a determination as to whether or not the conference room as a target is currently reserved is performed (ST101). In a case where the conference room as a target is currently not reserved (No in ST101), the process is finished.

In a case where the conference room as a target is currently reserved (Yes in ST101), a determination as to whether or not the cancelation disabling flag is set in the reservation is performed next (ST102). In a case where the cancelation disabling flag is set (Yes in ST102), the process is finished.

In a case where the cancelation disabling flag is not set (No in ST102), a determination as to whether or not the conference room is currently in use is performed next (ST103). In a case where the conference room is currently in use (Yes in ST103), the process is finished.

In a case where the conference room is currently not in use (No in ST103), a notification (cancelation notification) of canceling the reservation is transmitted to user terminal 4 of the reservation holder by electronic mail and the like (ST105). A determination as to whether or not there is a response of accepting the cancelation of the reservation is performed (ST112). In a case where there is a response of accepting the cancelation of the reservation (Yes in ST112), a process of canceling the usage reservation and updating the reservation information is performed (ST106).

In a case where there is no response of accepting the cancelation of the usage reservation (No in ST112), a determination as to whether or not the usage state is changed to the in-use state is performed (ST113). In a case where the usage state is changed to the in-use state (Yes in ST113), the process is finished.

In a case where the usage state is not changed to the in-use state (No in ST113), a determination as to whether or not a predetermined time period elapses from the transmission of the cancelation notification is performed next (ST114). In a case where the predetermined time period does not elapse from the transmission of the cancelation notification (No in ST114), a return is made to the determination as to whether or not there is a response of accepting the cancelation of the reservation (ST112).

In a case where the predetermined time period elapses from the transmission of the cancelation notification (Yes in ST114), the reservation is canceled, and the reservation information is updated (ST106).

In the present modification example, the user who wants to use the conference room checks the usage state of the conference room by browsing the area list screen (refer to FIG. 14; usage state presentation screen). Furthermore, a process of canceling the usage reservation of the conference room is started at a timing when the reservation state of the conference room that the user wants to use is checked. Accordingly, the user waits for cancelation, and the usage reservation of the conference room that is left unused is quickly canceled. Thus, the conference room can be used early. The usage state of the conference room may be checked from a plurality of users, and there may be competition in cancelation waiting. In this case, only the user who accesses first may be accepted as a cancelation waiting user. For the second user and later, a display (not illustrated) of setting the conference room to be non-usable (registration is present for cancelation waiting) may be displayed in tooltip 67.

Particularly, in the present modification example, in a case where there is a response of accepting the cancelation of the usage reservation in response to the notification (cancelation notification) of canceling the usage reservation, the usage reservation is canceled, and the reservation information is updated. In addition, in a case where there is no response of accepting the cancelation of the usage reservation after the notification of canceling the usage reservation is transmitted, and a predetermined time period elapses while the usage state of the conference room is not changed to the in-use state, the usage reservation is forcibly canceled, and the reservation information is updated. Accordingly, the conference room can be efficiently used by quickly canceling the usage reservation of the conference room not in use or the conference room that is less likely to be used.

In a case where the usage reservation of the conference room is canceled, a notification indicating that the usage reservation is canceled may be transmitted by electronic mail and the like to user terminal 4 on which the area list screen (refer to FIG. 14; usage state presentation screen) is displayed and the user performs a screen operation. Accordingly, since the user can quickly perceive that the usage reservation of the conference room is canceled, the conference room can be used early.

In the present exemplary embodiment, an example in which the conference room is the target area is described. However, the target area is not for limitation purposes and may be a room that is used for a purpose other than conference. The same applies to a case where a reservation is necessary for each of a plurality of sections set in one room as the target area like the common room.

Fourth Exemplary Embodiment

Figure 19:
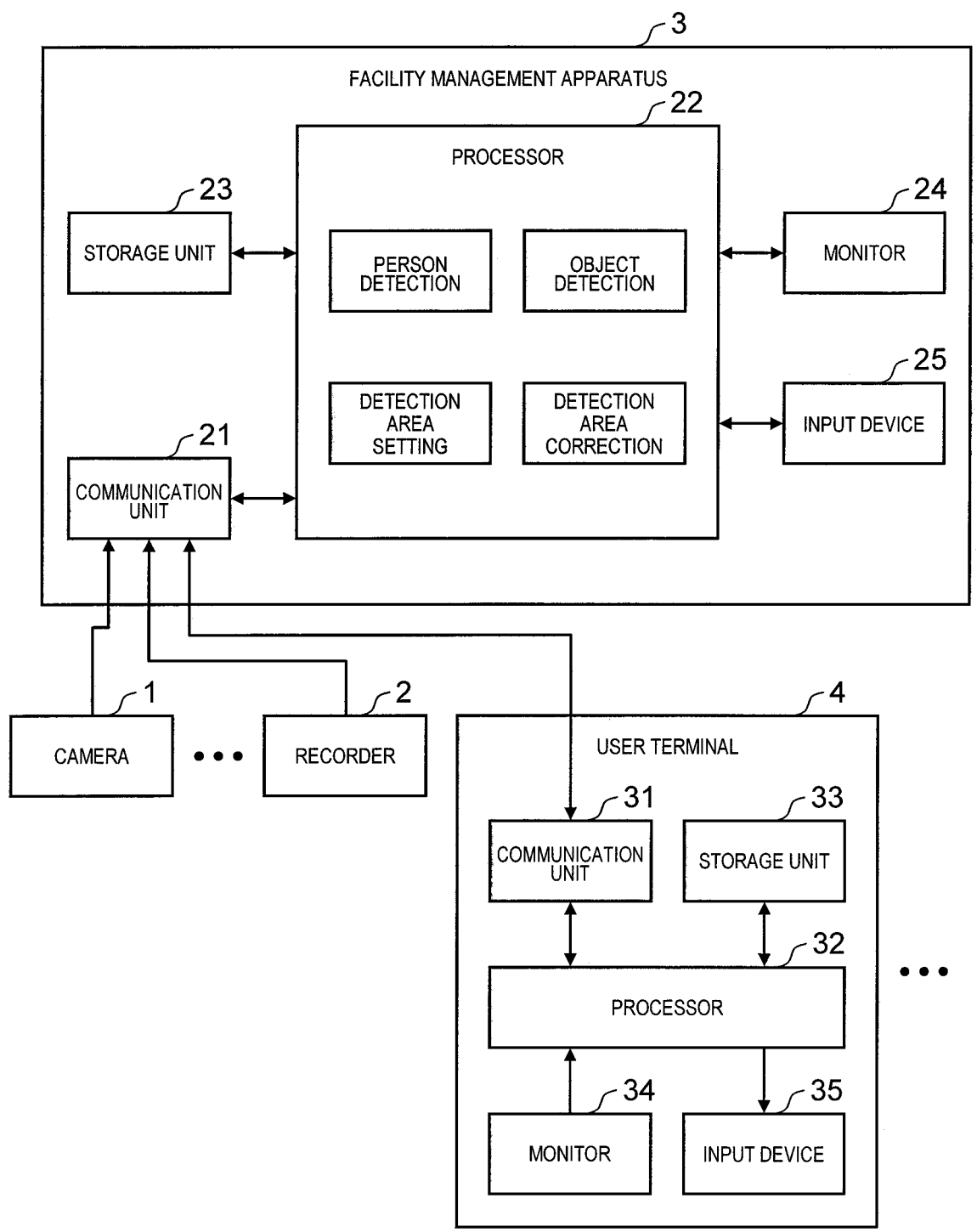
FIG. 19 is a block diagram illustrating a schematic configuration of facility management apparatus 3 and user terminal 4 according to a fourth exemplary embodiment.

Next, a fourth exemplary embodiment will be described. Points not particularly mentioned here are the same as the above exemplary embodiments. FIG. 19 is a block diagram illustrating a schematic configuration of facility management apparatus 3 and user terminal 4 according to the fourth exemplary embodiment.

In a store such as a restaurant, a free layout may be available. That is, customers and staff can freely move chairs and tables during an operation time period. In this case, each of the detection areas that is set on the video for detecting the seat occupancy of each of the persons deviates from the actual position of each of the seats. Thus, the accuracy of the seat occupancy detection is decreased.

Therefore, in the present exemplary embodiment, positions of template objects, specifically, tables and chairs, that are installed in the store and define the staying position of each of the persons are detected, and each of the detection areas is set based on the detection result. By periodically performing this process, each of the detection areas is updated at all times, and a decrease in accuracy of the seat occupancy detection can be avoided even in a case where customers and staff move chairs and tables.

Facility management apparatus 3 includes communication unit 21, processor 22, storage unit 23, monitor 24 (display apparatus), and input device 25 in the same manner as the first exemplary embodiment.

Communication unit 21, storage unit 23, monitor 24, and input device 25 are the same as the first exemplary embodiment.

Processor 22 performs each process of person detection, object detection, detection area setting, and detection area correction. In addition, the processor performs each process of seat occupancy detection and screen control in the same manner as the first exemplary embodiment.

In the person detection process, each of the persons is detected from the video obtained from camera 1. In a case where a person is present in the video, the detection accuracy of chairs and tables is decreased in the object detection process. Thus, in a case where a person is detected from the video, the subsequent processes of object detection and detection area setting are not performed.

In the object detection process, chairs and tables are detected from the video obtained from camera 1, and positional information of each of the chairs and tables is obtained. The object detection may be performed by causing a discriminator to learn the chairs and tables (template objects) installed in the store in advance before the object detection process. By learning the template objects, the detection accuracy of object detection can be improved.

In the detection area setting process, each of the detection areas as a target of the seat occupancy detection as to whether or not each of the persons occupies each of the seats is set based on the positional information of each of the chairs and tables obtained in the object detection process. At this point, chairs and tables positioned away from camera 1 are captured in a small size in the video. Thus, the size of each of the detection areas is corrected depending on a distance from camera 1.

In the detection area correction process, in a case where there is an error in each of the detection areas set in the detection area setting process, a detection area editing screen (refer to FIG. 23) is displayed on monitor 24. The position and size of each of the detection areas is corrected depending on an operation performed on the detection area editing screen by the operator.

In the present exemplary embodiment, the staying information related to the staying state of each of the persons is obtained by the seat occupancy detection, and the display information is generated based on the staying information in the same manner as the first exemplary embodiment. Alternatively, the staying map (seat occupancy map) may be generated as the display information in the same manner as the first exemplary embodiment. Accordingly, the staying state of each of the customers can be perceived at a glance in a large store.

In addition, statistical information such as a seat occupancy time period, a seat occupancy rate, and an average staying time period of each of the customers related to an operation state of the store may be generated based on the staying information, and the display information related to the statistical information may be generated.

Figure 20:
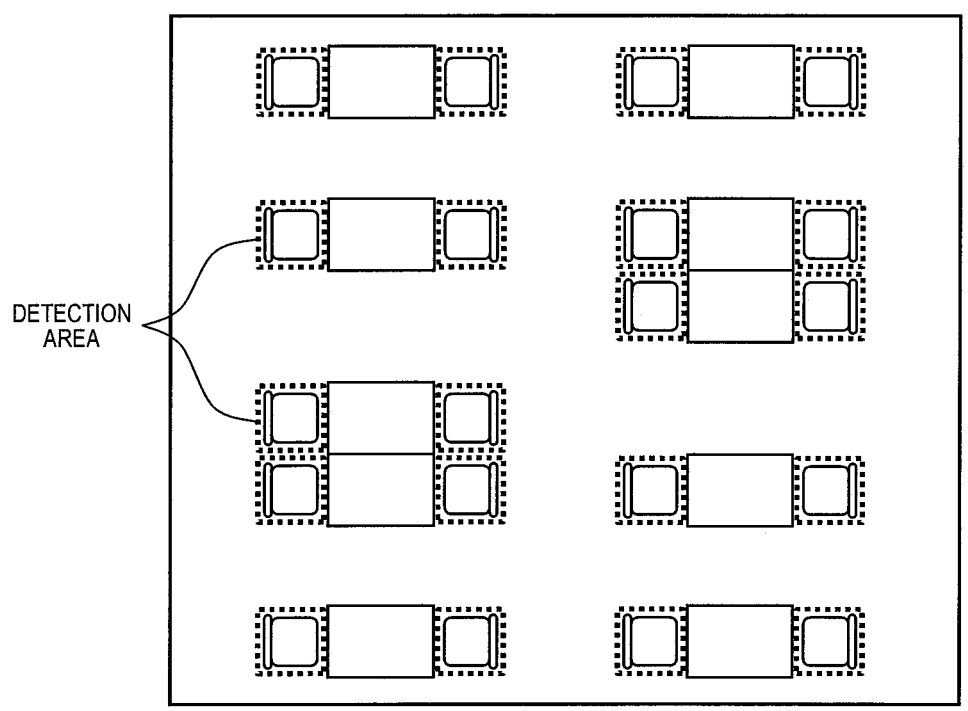
FIG. 20 is a descriptive diagram illustrating a setting state of detection areas according to the fourth exemplary embodiment.

Next, a setting state of each of the detection areas according to the fourth exemplary embodiment will be described. FIG. 20 is a descriptive diagram illustrating a setting state of each of the detection areas.

The tables and chairs installed inside the store are captured in the video of camera 1. The tables and chairs are detected by the object detection with respect to the video, and each of the detection areas is set on the video based on the detection result.

Figure 21:
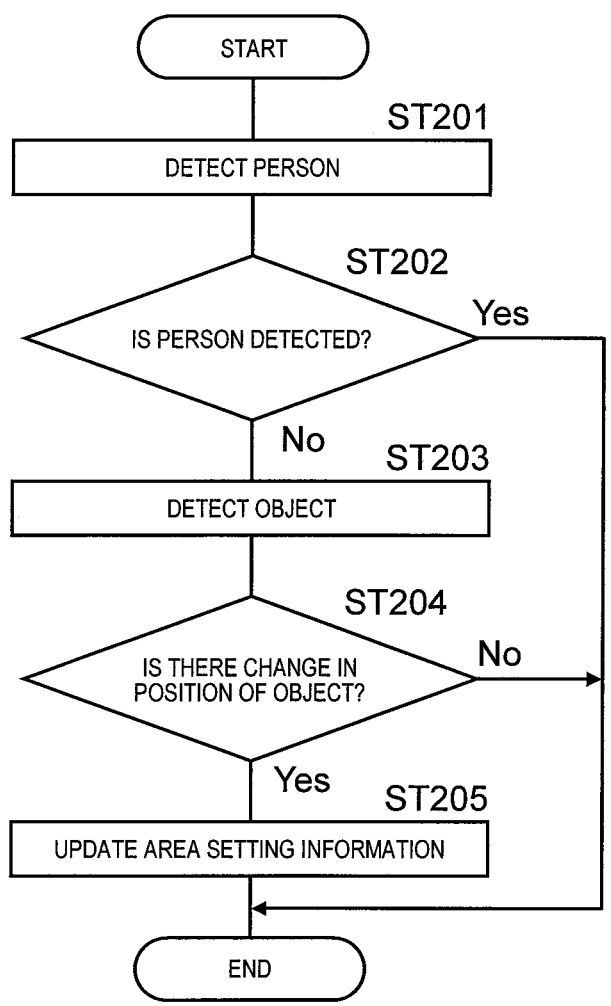
FIG. 21 is a flowchart illustrating a processing procedure of facility management apparatus 3 according to the fourth exemplary embodiment.

Next, a processing procedure of facility management apparatus 3 according to the fourth exemplary embodiment will be described. FIG. 21 is a flowchart illustrating a processing procedure of facility management apparatus 3.

In the present exemplary embodiment, positions of template objects, specifically, tables and chairs, that are installed in the store and define the staying position of each of the persons are detected, and each of the detection areas is set based on the detection result. By periodically performing this process for each constant time period (for example, 15 minutes or 30 minutes), each of the detection areas is updated at all times.

Specifically, first, in processor 22, the video of camera 1 is obtained, and a process of detecting a person from the video is performed (ST201). A determination as to whether or not a person is detected in the person detection process is performed (ST202).

In a case where a person is not detected (No in ST202), a process of detecting objects (chairs and tables) from the video of camera 1 is performed next (ST203). A determination as to whether or not there is a change in position of each of the objects is performed by comparing the position of each of the detected objects with the position of each of the objects registered in area setting information in storage unit 23 (ST204).

In a case where there is a change in position of each of the objects (Yes in ST204), each of the detection areas is set based on the positional information of each of the detected objects, and the area setting information is updated (ST205). That is, the positional information of each of the detection areas that are newly set based on the position of each of the detected objects is registered in the area setting information.

In a case where a person is detected (Yes in ST202) or there is no change in position of each of the objects (No in ST204), the processes of the object detection and the area setting are not performed.

In the present exemplary embodiment, the person detection is performed before the object detection. Alternatively, the person detection may not be performed. In addition, the user may select whether or not to perform the person detection in user setting.

Figure 22:
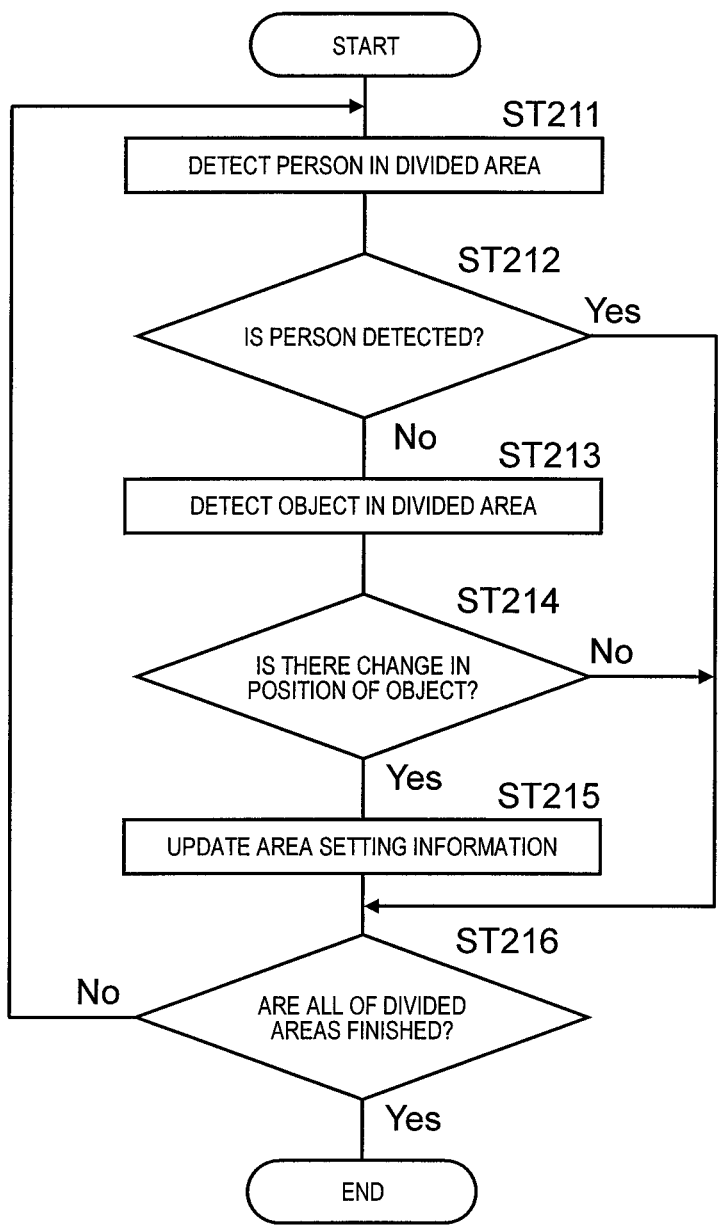
FIG. 22 is a flowchart illustrating a modification example of the processing procedure of facility management apparatus 3 according to the fourth exemplary embodiment.

Next, a modification example of the processing procedure of facility management apparatus 3 according to the fourth exemplary embodiment will be described. FIG. 22 is a flowchart illustrating a modification example of the processing procedure of facility management apparatus 3.

In the example illustrated in FIG. 21, the processes of the object detection and the area setting are performed at a timing when a person is not detected. Alternatively, in the present modification example, the processes of the object detection and the area setting are performed for a location in which a person is not detected as a target. That is, the target area is divided into a plurality of divided areas, and the processes of the object detection and the area setting are performed for each of the divided areas where a person is not detected as a target. For example, each of the divided areas may be a cell obtained by equally dividing the target area.

Specifically, first, in processor 22, a process of detecting a person from the video of camera 1 using the first divided area as a target is performed (ST211). A determination as to whether or not a person is detected in the person detection process is performed (ST212).

In a case where a person is not detected (No in ST212), a process of detecting each of the objects from the video using each of the divided areas as a target is performed next (ST213). A determination as to whether or not there is a change in position of each of the objects is performed by comparing the position of each of the detected objects with the position of each of the objects registered in the area setting information in storage unit 23 (ST214).

In a case where there is a change in position of each of the objects (Yes in ST214), each of the detection areas is set based on the positional information of each of the detected objects, and the area setting information is updated (ST215). That is, the positional information of each of the detection areas that are newly set based on the position of each of the detected objects is registered in the area setting information.

Next, a determination as to whether or not all of the processing of divided areas are finished is performed (ST216). In a case where not all of the processing of divided areas are finished (No in ST216), a transition is made to the processing of the subsequent divided area.

In a case where a person is detected in the person detection process (Yes in ST212) or there is no change in position of each of the objects (No in ST214), the processes of the object detection and the area setting using each of the divided areas as a target are not performed, and a transition is made to the determination as to whether or not the processing of divided areas are finished (ST216).

Figure 23:
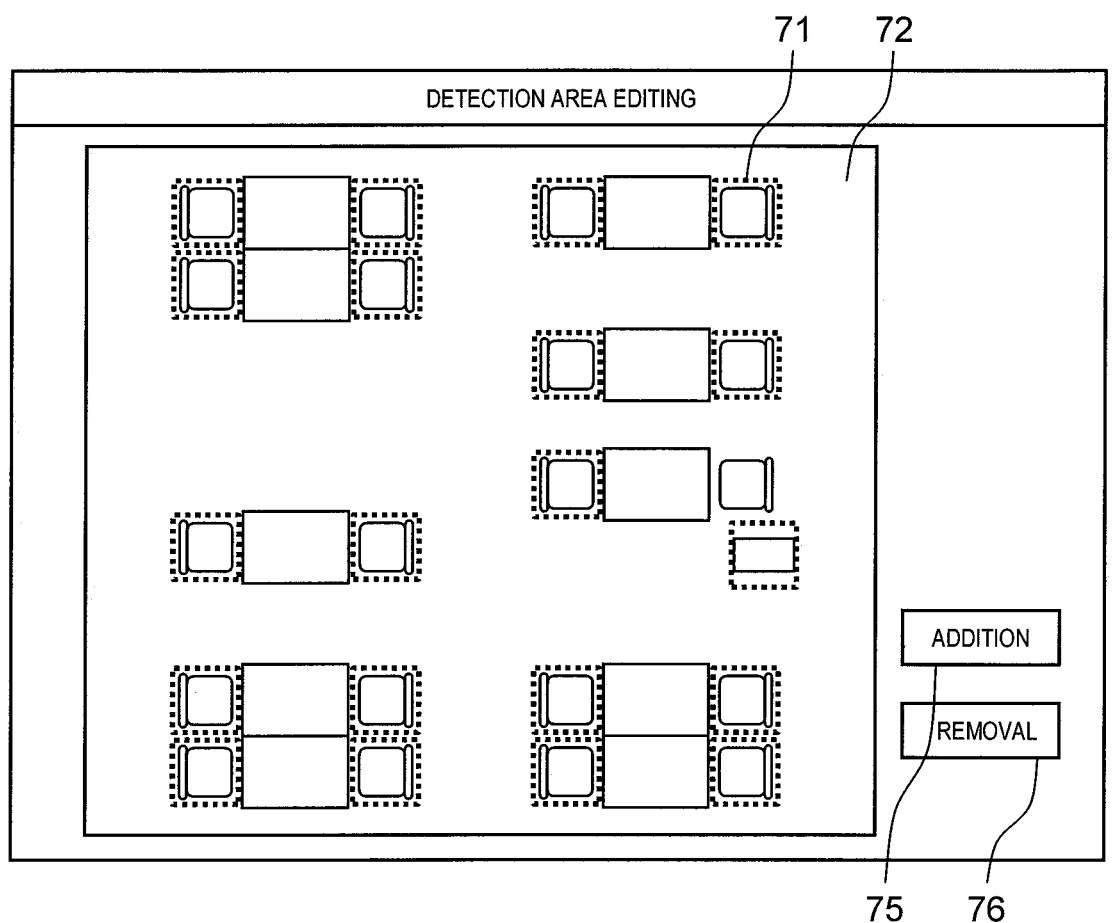
FIG. 23 is a descriptive diagram illustrating a detection area editing screen according to the fourth exemplary embodiment.

Next, the detection area editing screen according to the fourth exemplary embodiment will be described. FIG. 23 is a descriptive diagram illustrating the detection area editing screen.

In the present exemplary embodiment, the positional information of the chairs and tables is obtained by the object detection with respect to the video, and each of the detection areas is set based on the positional information. Alternatively, in the object detection process, for example, a luggage may be erroneously detected as a chair or a table. In this case, the position and size of each of the detection areas are not appropriately set. Therefore, in the present exemplary embodiment, the position and size of each of the detection areas can be corrected in the detection area editing screen illustrated in FIG. 23.

In the detection area editing screen, borderline 71 (detection area image) representing the range of each of the detection areas is displayed on video 72 of camera 1 based on the positional information of each of the detection areas obtained in the area setting process. It is possible to check whether or not the position and size of each of the detection areas are different from the actual position and size thereof. In a case where the position and size of a detection area are different from the actual position and size thereof, the position and size of the detection area can be corrected by selecting borderline 71 of the detection area and performing a moving and size changing operation.

For example, a correction operation is enabled by setting borderline 71 of the detection area to be in a selection state by a left click. Borderline 71 of the detection area can be moved to a correct position by a drag & drop operation. In addition, in the selection state of borderline 71 of the detection area, in a case where the pointer is overlaid on borderline 71 of the detection area, the pointer changes to a bidirectional arrow, and the size of borderline 71 of the detection area can be corrected.

In addition, button 75 of "addition" and button 76 of "removal" are disposed in the detection area editing screen. In a case where button 75 of "addition" is operated, borderline 71 of a new detection area appears on video 72. Borderline 71 of the detection area can be set to an appropriate position and size by performing a moving and size changing operation for borderline 71 of the detection area. In addition, in a case where button 76 of "removal" is operated, borderline 71 of the detection area in the selection state can be removed.

In the present exemplary embodiment, borderline 71 of each of the detection areas is displayed on video 72 of camera 1. At this point, image processing for correcting a distortion in the video of the omnidirectional camera may be performed.

Fifth Exemplary Embodiment

Figure 24:
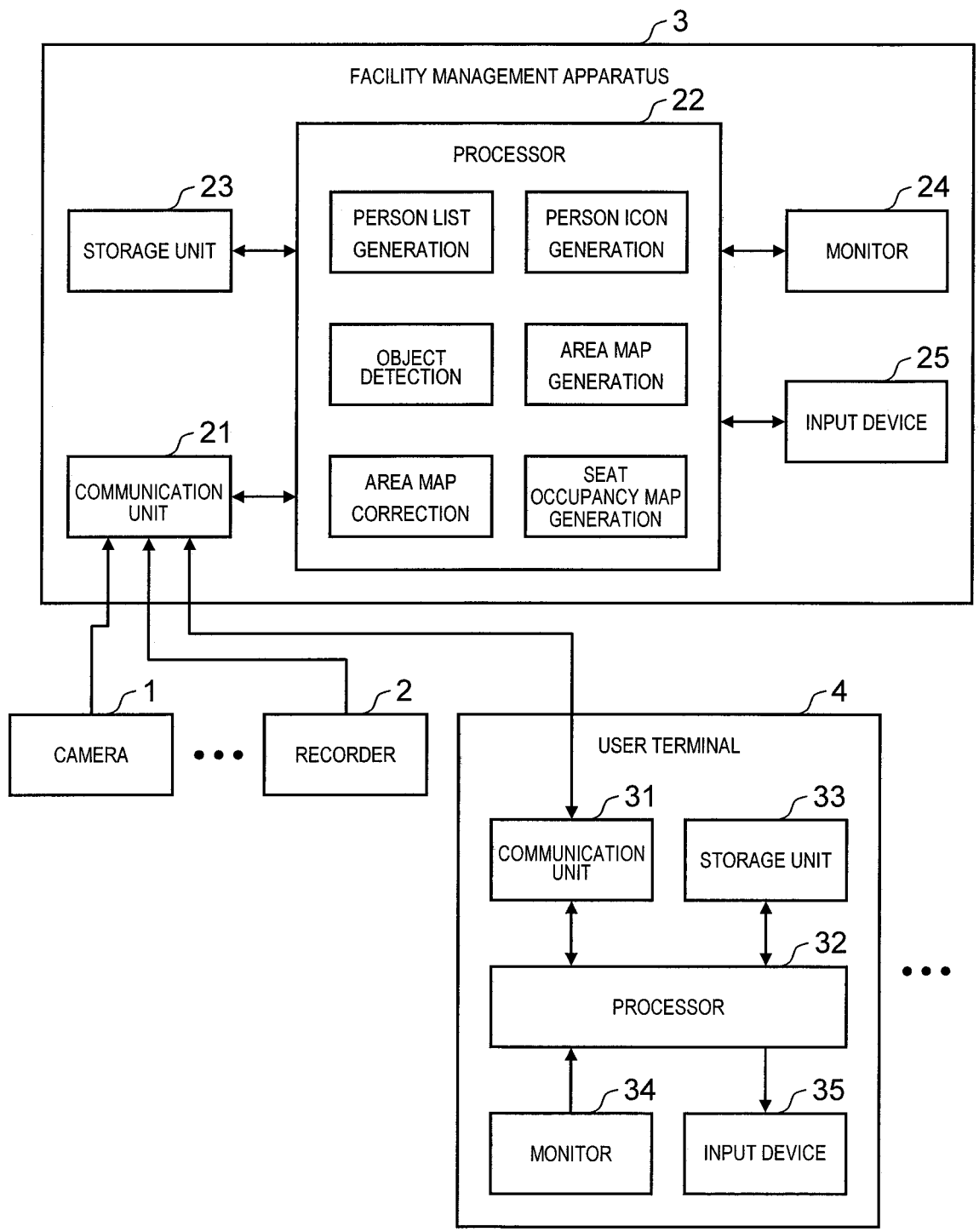
FIG. 24 is a block diagram illustrating a schematic configuration of facility management apparatus 3 and user terminal 4 according to a fifth exemplary embodiment.

Next, a fifth exemplary embodiment will be described. Points not particularly mentioned here are the same as the above exemplary embodiments. FIG. 24 is a block diagram illustrating a schematic configuration of facility management apparatus 3 and user terminal 4 according to the fifth exemplary embodiment.

In the second exemplary embodiment, seat occupancy map 52 (refer to FIG. 10) representing the seat occupancy state of each of the persons is displayed on user terminal 4. Alternatively, in the present exemplary embodiment, seat occupancy map 52 is created by an editing operation performed in facility management apparatus 3 by the operator.

In the present exemplary embodiment, seat occupancy map 52 is created in facility management apparatus 3. Alternatively, an application program for seat occupancy map editing may be installed on user terminal 4 operated by the manager, and seat occupancy map 52 may be created in user terminal 4.

Facility management apparatus 3 includes communication unit 21, processor 22, storage unit 23, monitor 24 (display apparatus), and input device 25 in the same manner as the first exemplary embodiment.

Communication unit 21, storage unit 23, monitor 24, and input device 25 are the same as the first exemplary embodiment. Storage unit 23 further stores belonging information and the face image of each of the persons.

Processor 22 performs each process of person list generation, person icon generation, object detection, area map generation, area map correction, and seat occupancy map generation. In addition, processor 22 performs each process of seat occupancy detection and screen control in the same manner as the first exemplary embodiment.

In the person list generation process, person list 81 (refer to FIG. 25) that is displayed in the seat occupancy map editing screen is generated based on the belonging information of each of the persons obtained from storage unit 23.

In the person icon generation process, person icon 53 (refer to FIG. 25) in which the face image of each of the persons obtained from storage unit 23 is embedded is generated.

In the object detection process, each of the objects is detected from the video of camera 1, and the positional information of each of the objects in the office (target area) is obtained. In the present exemplary embodiment, chairs and desks are detected from the video, and positional information of each of the chairs and desks is obtained.

In the area map generation process, area map 44 (refer to FIG. 25) that represents the layout of the office (target area) is generated based on the positional information of each of the chairs and desks.

In the seat occupancy map generation process, the seat occupancy map editing screen (refer to FIG. 25) is displayed on monitor 24. Seat occupancy map 52 in which person icon 53 is arranged at the position of the seat of each of the persons on area map 44 is generated depending on an operation performed on the seat occupancy map editing screen by the operator.

In the area map correction process, in a case where there is an error in area map 44 generated in the area map generation process, an area map editing screen (refer to FIG. 27) is displayed on monitor 24. Area map 44 is corrected depending on an operation performed on the area map editing screen by the operator.

In the present exemplary embodiment, facility management apparatus 3 stores the belonging information and the face image of each of the persons. Alternatively, the belonging information and the face image may be obtained from an apparatus dedicated for organization management. In addition, facility management apparatus 3 itself may perform the organization management.

Figure 25:
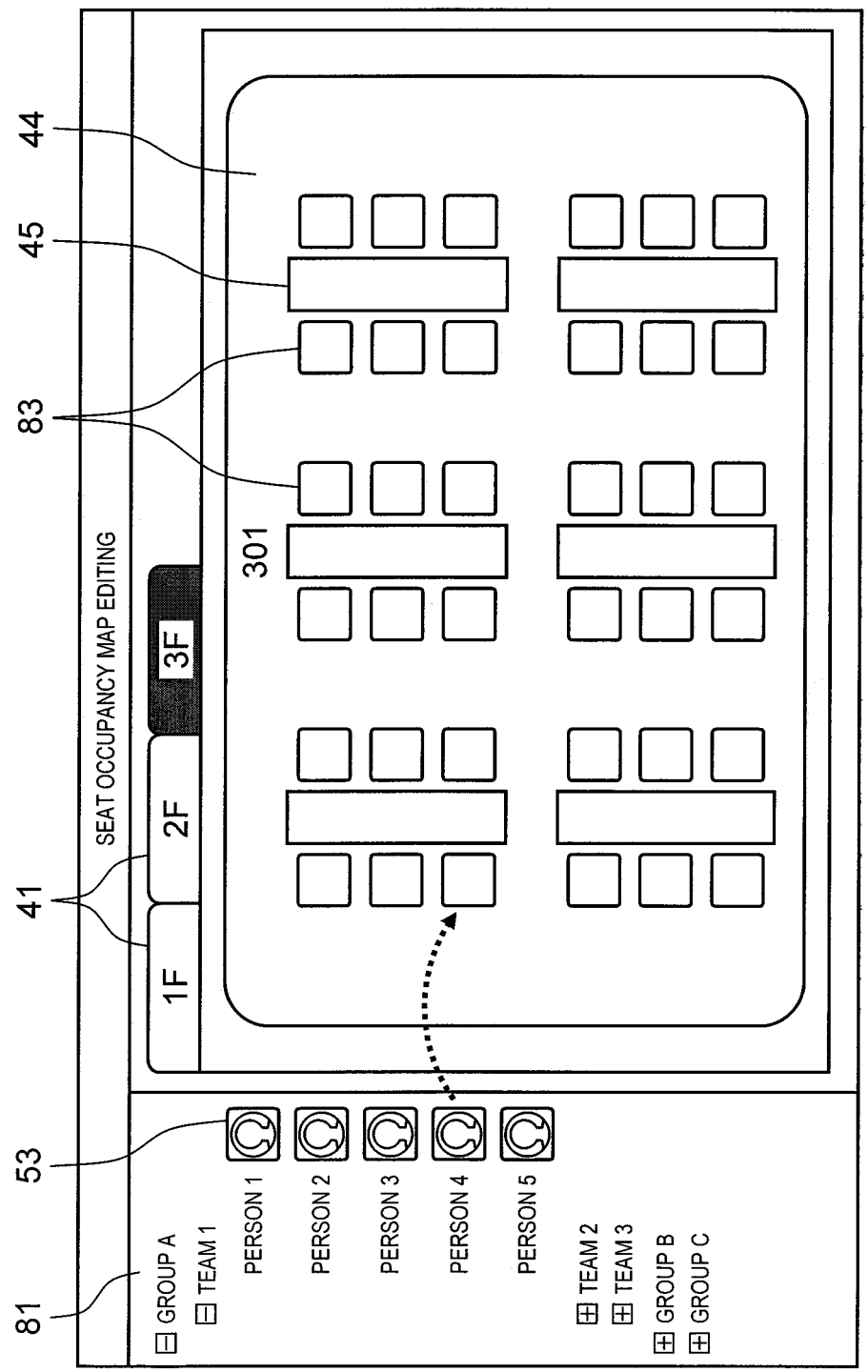
FIG. 25 is a descriptive diagram illustrating a seat occupancy map editing screen according to the fifth exemplary embodiment.
Figure 26:
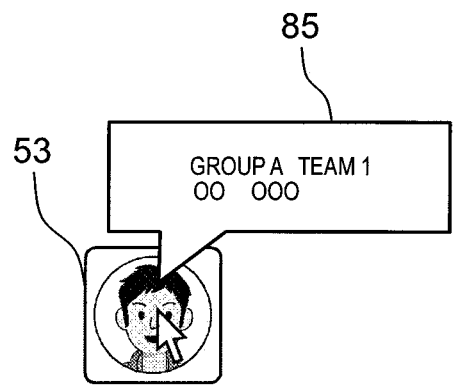
FIG. 26 is a descriptive diagram illustrating a main part of the seat occupancy map editing screen according to the fifth exemplary embodiment.

Next, the seat occupancy map editing screen displayed on monitor 24 according to the fifth exemplary embodiment will be described. FIG. 25 is a descriptive diagram illustrating the seat occupancy map editing screen. FIG. 26 is a descriptive diagram illustrating a main part of the seat occupancy map editing screen.

In facility management apparatus 3, the seat occupancy map editing screen illustrated in FIG. 25 is displayed on monitor 24, and seat occupancy map 52 is created by causing the operator to perform an editing operation. The editing of the seat occupancy map is performed at the time of introducing the system. In addition, the editing is performed when the layout of the office (target area) is changed or there is a movement in position of each of the persons.

Tab 41 of each floor (1F, 2F, and 3F) is disposed in the seat occupancy map editing screen. In a case where tab 41 is selected, a screen of the selected floor is displayed. At this point, the same screen as the area list screen (refer to FIG. 9) illustrated in the second exemplary embodiment is displayed, and a transition is made to the seat occupancy map editing screen illustrated in FIG. 25 by selecting a room as an editing target.

In addition, person list 81 is displayed in the seat occupancy map editing screen. The name and person icon 53 (person image) of each of the persons classified based on the configuration of the organization to which each of the persons belongs is displayed in a list in person list 81. Specifically, the names of groups, the names of teams constituting each of the groups, and the name and person icon 53 of each of the persons belonging to each of the teams are displayed in order. The face image of each of the persons is embedded in each of person icons 53.

In addition, area map 44 (area image) representing the room as a target is displayed in the seat occupancy map editing screen. In area map 44, seat border 83 (object image) in which person icon 53 is arranged is drawn at the position (original position of each of the persons) of each of the seats (chairs), and image 45 (object image) of each of the desks is drawn at the position of each of the desks.

The operator can move each of person icons 53 displayed in person list 81 onto area map 44 and attach each of person icons 53 onto each of seat borders 83 in area map 44 by a predetermined operation, for example, a drag & drop operation. By sequentially performing the operation of attaching each of person icons 53 to area map 44 for each of the persons, the seat occupancy map in which person icon 53 of each of the persons is arranged at the position of the seat of each of the persons is completed.

At this point, in a case where control is performed such that each of person icons 53 is attached onto only each of seat borders 83 in area map 44, the editing operation of attaching each of person icons 53 onto area map 44 by the operator is facilitated.

In the present exemplary embodiment, each of person icons 53 is arranged on area map 44 in which each of seat borders 83 and image 45 of each of the desks are drawn as an area image representing the target area. Alternatively, each of person icons 53 may be arranged on the video of camera 1. In this case, image processing for correcting a distortion in the video may be performed.

In addition, as illustrated in FIG. 26, in a case where a predetermined operation, for example, a mouseover operation, is performed on person icon 53 attached to seat border 83 in area map 44, tooltip 85 in which the name and belonging (group and team) of the person corresponding to person icon 53 are described is displayed. Accordingly, the operator can check whether or not there is an error in person icon 53 arranged in area map 44.

In the present exemplary embodiment, tooltip 85 is displayed by a mouseover operation. However, such an operation is not for limitation purposes.

Figure 27:
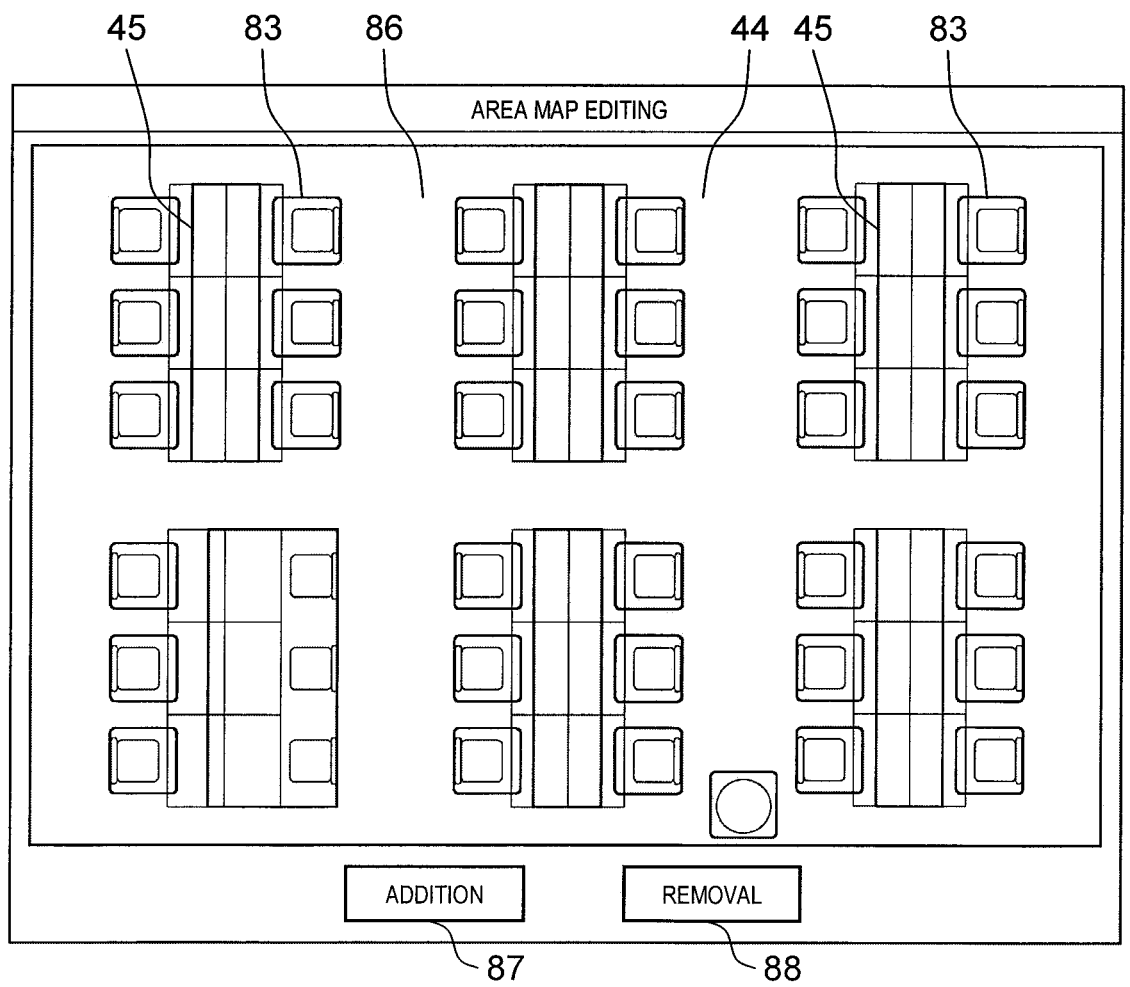
FIG. 27 is a descriptive diagram illustrating an area map editing screen according to the fifth exemplary embodiment.

Next, the area map editing screen according to the fifth exemplary embodiment will be described. FIG. 27 is a descriptive diagram illustrating the area map editing screen.

In the present exemplary embodiment, the positional information of each of the chairs and desks is obtained by the object detection with respect to the video, and area map 44 in which each of seat borders 83 and image 45 of each of the desks are drawn is generated based on the positional information. However, in a case where erroneous detection occurs in the object detection, the position and size of each of seat borders 83 or image 45 of each of the desks on area map 44 may be different from the actual position and size thereof. Therefore, in the present exemplary embodiment, the position and size of each of seat borders 83 or image 45 of each of the desks on the area map can be corrected in the area map editing screen illustrated in FIG. 27.

In the area map editing screen, area map 44 generated in the area map generation process is displayed on video 86 of camera 1. It is possible to check whether or not the position and size of each of seat borders 83 or image 45 of each of the desks are different from the actual position and size thereof. In a case where the position and size of seat border 83 and image 45 of a desk are different from the actual position and size thereof, the position and size of seat border 83 and image 45 of the desk can be corrected by selecting seat border 83 and image 45 of the desk and performing a moving and size changing operation.

For example, a correction operation is enabled by setting seat border 83 to be in a selection state by a left click. Seat border 83 can be moved to a correct position by a drag & drop operation. In addition, in the selection state of seat border 83, in a case where the pointer is overlaid on the borderline of seat border 83, the pointer changes to a bidirectional arrow, and the size of seat border 83 can be corrected. The position and size of image 45 of the desk can be corrected in the same manner as seat border 83.

In addition, button 87 of "addition" and button 88 of "removal" are disposed in the area map editing screen. In a case where button 87 of "addition" is operated, new seat border 83 and image 45 of a new desk appear on area map 44. Seat border 83 and image 45 of the desk can be set to an appropriate position and size by performing a moving and size changing operation for seat border 83 and image 45 of the desk. In addition, in a case where button 88 of "removal" is operated, seat border 83 in the selection state and image 45 of the desk can be removed.

In the present exemplary embodiment, area map 44 is displayed on video 86 of camera 1. At this point, image processing for correcting a distortion in the video of the omnidirectional camera may be performed.

Exemplary embodiments are described thus far as illustrations of the technology disclosed in the present application. However, the technology in the present disclosure is not limited to the exemplary embodiments and can also be applied to exemplary embodiments in which change, replacement, addition, omission, and the like are made. In addition, new exemplary embodiments can be made by combining each of the constituents described in the exemplary embodiments.

INDUSTRIAL APPLICABILITY

A staying state display system and a staying state display method according to the present disclosure has an effect of enabling information having an appropriate content corresponding to an area in which persons stays to a user as information related to a staying state of each of the persons in each area inside a facility. The staying state display system and the staying state display method according to the present disclosure are effective as a staying state display system, a staying state display method, and the like generating display information related to the staying state of each of the persons in a target area based on a video captured by a camera installed in the facility.

REFERENCE MARKS IN THE DRAWINGS

1 CAMERA
2 RECORDER
3 FACILITY MANAGEMENT APPARATUS
4 USER TERMINAL
22 PROCESSOR
42 SEAT OCCUPANCY MAP
43 SEAT ICON
44 AREA MAP
46 AREA ICON
47 SECTION ICON
51 AREA ICON
52 SEAT OCCUPANCY MAP
53 PERSON ICON
55 POP-UP MENU
57 TOOLTIP
61 AREA ICON (TEMPLATE IMAGE)
65 POP-UP MENU
67 TOOLTIP
71 BORDERLINE OF DETECTION AREA
72 VIDEO
81 PERSON LIST
83 SEAT BORDER
85 TOOLTIP
86 VIDEO

The invention claimed is:

1. A staying state display system, comprising:
a processor configured to execute a process of obtaining a video captured by a camera, the camera being installed in a facility, the processor generating display information related to a staying state of a person in a target area,
wherein the camera captures the video at each predetermined time in a predetermined sampling cycle,
the processor
obtains, for each detection area of the camera, a video change rate for a current time by comparing video of the detection area at the current time with video of the detection area at an immediately previous time in the predetermined sampling cycle,
detects staying of the person in the detection area in which staying of the person is expected and obtains staying information related to the staying state of the person in the detection area based on the video change rate, and
generates the display information on which the staying information is reflected in accordance with a display item corresponding to an area attribute that is set in advance for the target area.

2. The staying state display system of claim 1,
wherein the processor generates the display information in accordance with the display item for which the area attribute of a room as the target area corresponds to any of a workroom, a conference room, and a common room.

3. The staying state display system of claim 1,
wherein the processor generates the display information using a usage state of an aggregate area in which a plurality of detection areas is aggregated as the display item.

4. The staying state display system of claim 3,
wherein the area attribute includes a first area attribute for which a seat occupancy state of the person in each detection area is used as the display item, a second area attribute for which a usage state of the whole target area is used as the display item, and a third area attribute for which a usage state of each of a plurality of sections set inside the target area is used as the display item.

5. The staying state display system of claim 1,
wherein the processor generates the display information in which a template image illustrating the staying state is superimposed on an area map representing a layout of the target area.

6. A staying state display system, comprising:
a processor configured to execute a process of obtaining a video captured by a camera in real time, the camera being installed in a facility, the processor and generating display information related to a current staying state of a person in a target area,
wherein the camera captures the video at each predetermined time in a predetermined sampling cycle,
the processor
obtains, for each detection area of the camera, a video change rate for a current time by comparing video of the detection area at the current time with video of the detection area at an immediately previous time in the predetermined sampling cycle, detects staying of the person in the detection area in which staying of the person is expected in the target area and obtains staying information related to the current staying state of the person in the detection area based on the video change rate, generates a person image of which a display form varies depending on the current staying state of the person based on the staying information, and generates the display information in which the person image is superimposed on an area image representing the target area.

7. The staying state display system of claim 6,
wherein the processor
generates second display information in which a plurality of target areas is displayed in a list, and
depending on an operation of selecting the target area by a user, generates the display information related to the selected target area.

8. The staying state display system of claim 6,
wherein the person image includes a face image that is registered in advance.

9. The staying state display system of claim 6,
wherein the processor changes a display color of the person image depending on whether or not the person currently stays.

10. The staying state display system of claim 6,
wherein the processor changes a display color of the person image depending on a length of an absence time period of the person.

11. The staying state display system of claim 6,
wherein the processor, depending on an operation of selecting the person image by a user, displays past and future staying states of the person related to the operation.

12. The staying state display system of claim 6,
wherein the processor, depending on an operation of selecting the person image by a user, displays a schedule of the person related to the operation.

13. The staying state display system of claim 6,
wherein the processor, depending on an operation of selecting the person image by a user, displays a screen for creating an electronic mail having the person related to the operation as a recipient.

14. A staying state display system, comprising:
a processor configured to execute a process of obtaining a video captured by a camera in real time, the camera being installed in a facility, the processor generating display information related to a current staying state of a person in a target area, the target area being usable through a reservation, wherein the camera captures the video at each predetermined time in a predetermined sampling cycle, the processor
obtains a video change rate for a current time by comparing video of the target area at the current time with video of the target area at an immediately previous time in the predetermined sampling cycle, detects staying of the person in the target area and obtains staying information related to the current staying state of the person in the target area based on the video change rate, determines a usage state of the target area based on the staying information, obtains reservation information related to the target area, and generates the display information including a template image representing the current usage state of the target area and information related to a current reservation state of the target area.

15. The staying state display system of claim 14,
wherein the processor, depending on an operation of selecting the template image representing a not-in-use state by a user, displays information related to the current reservation state of the target area corresponding to the selected template image.

16. The staying state display system of claim 14,
wherein the processor executes control for canceling the information related to the current reservation state of the target area in a case where the usage state of the target area is not changed to an in-use state and a predetermined time period elapses.

17. The staying state display system of claim 14,
wherein the processor, depending on an operation of selecting the template image representing a not-in-use state by a user, notifies a reservation holder that a usage reservation of the target area is canceled in a case where the usage reservation is already made on the target area corresponding to the selected template image.

18. The staying state display system of claim 17,
wherein the processor immediately cancels the usage reservation of the target area and updates the reservation information in a case where there is a response of accepting the cancelation of the usage reservation in response to a notification of canceling the usage reservation of the target area.

19. The staying state display system of claim 17,
wherein the processor cancels the usage reservation of the target area and updates the reservation information in a case where there is no response of accepting cancelation of the usage reservation in response to a notification of canceling the usage reservation of the target area and a state where the usage state of the target area is not changed to an in-use state continues for a predetermined time period.

20. The staying state display system of claim 14,
wherein the processor sets the template image to be in a non-operable state or a non-display state in a case where setting for disabling a cancelation of the usage reservation of the target area is performed.

* * * * *